(12) United States Patent
Tanaka et al.

(10) Patent No.: US 8,582,888 B2
(45) Date of Patent: Nov. 12, 2013

(54) METHOD AND APPARATUS FOR RECOGNIZING BOUNDARY LINE IN AN IMAGE INFORMATION

(75) Inventors: Hiroshi Tanaka, Kawasaki (JP); Kenji Nakajima, Kawasaki (JP); Akihiro Minagawa, Kawasaki (JP); Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 12/071,050

(22) Filed: Feb. 14, 2008

(65) Prior Publication Data

US 2008/0199082 A1 Aug. 21, 2008

(30) Foreign Application Priority Data

Feb. 16, 2007 (JP) .................................. 2007-035707

(51) Int. Cl.
*G06K 9/18* (2006.01)

(52) U.S. Cl.
USPC ............ 382/182; 382/151; 382/181; 382/190

(58) Field of Classification Search
USPC ......... 382/151, 181, 182, 186, 190, 199, 202, 382/218
See application file for complete search history.

(56) References Cited

U.S. PATENT DOCUMENTS

| | | | | |
|---|---|---|---|---|
| 5,028,991 A | * | 7/1991 | Sekizawa et al. | 358/537 |
| 5,481,319 A | * | 1/1996 | Kershaw et al. | 348/699 |
| 6,118,897 A | * | 9/2000 | Kohno | 382/190 |
| 6,317,220 B1 | * | 11/2001 | Fujita et al. | 358/3.12 |
| 7,362,881 B2 | * | 4/2008 | Hattori et al. | 382/103 |
| 2002/0051574 A1 | * | 5/2002 | Kashioka et al. | 382/199 |
| 2002/0060733 A1 | * | 5/2002 | Takanashi | 348/95 |
| 2002/0097441 A1 | * | 7/2002 | Hara et al. | 358/302 |
| 2002/0118878 A1 | * | 8/2002 | Tanahashi et al. | 382/181 |
| 2002/0191813 A1 | * | 12/2002 | Uchida et al. | 382/100 |
| 2004/0240749 A1 | * | 12/2004 | Miwa et al. | 382/274 |
| 2007/0269088 A1 | * | 11/2007 | Ikemoto | 382/128 |
| 2008/0253656 A1 | * | 10/2008 | Schwartzberg et al. | 382/181 |

FOREIGN PATENT DOCUMENTS

| | | |
|---|---|---|
| JP | 1-217583 | 8/1989 |
| JP | 10-40333 | 2/1998 |

* cited by examiner

*Primary Examiner* — Vu Le
*Assistant Examiner* — Aklilu Woldemariam
(74) *Attorney, Agent, or Firm* — Staas & Halsey LLP

(57) ABSTRACT

According to an aspect of an embodiment, a method of detecting boundary line information contained in image information comprising a plurality of pixels in either one of first and second states, comprising: detecting a first group of pixels in the first state disposed continuously in said image information to determine first line information and detecting a second group of pixels in the first state disposed adjacently with each other and surrounded by pixels in the second state to determine edge information based on the contour of the second group of pixels; and determining the boundary line information on the basis of the information of the relation of relative position of the line information and the edge information and the size of the first and second group of pixels.

12 Claims, 21 Drawing Sheets

1201

1301

1401

METHOD AND APPARATUS FOR RECOGNIZING BOUNDARY LINE IN AN IMAGE INFORMATION

BACKGROUND OF THE INVENTION

1. Field of the Invention

The present invention relates to a table recognition method for extracting ruled lines in a table in a document image.

2. Description of the Related Art

Document-image recognition technology, such as an OCR (Optical Character Reader or Optical Character Recognition) technology, is available for digitizing tasks that have been operated on paper documents and converting documents distributed in paper form into electronic documents. Since a document may contain a table or tables, technology for table recognition is important. A table is generally expressed by a combination of vertical and horizontal ruled lines. The table recognition is performed by extracting layout information of table ruled lines from a document image and analyzing the table structure based on the extracted ruled-line layout information. Thus, technology for extracting ruled lines is required for accurately recognizing a table.

One example of a method for extracting table ruled lines is a method for detecting ruled lines from continuous pixels in a document image. The method for detecting ruled lines from continuous pixels has a high accuracy in detection of solid lines, but cannot detect line segments other than solid lines. Another method is to detect ruled lines by using a technique for extracting edges in an image. When the technique for extracting edges is used to detect ruled lines, two ruled-line candidates are generated from a solid line and thus need to be integrated together in subsequent processing. This method has a low accuracy compared to the method for detecting ruled lines from continuous pixels. When ruled lines are detected by the two methods and the results obtained thereby are then integrated together, subsequent processing is required as well. As described above, with only a combination of the method for detecting ruled lines from continuous pixels and the method for detecting ruled lines by using the edge-extraction technique, it is difficult to extract ruled lines from an image in which multiple types of ruled lines coexist.

Border ruled lines formed by a texture cannot be detected by the method for detecting ruled lines from continuous pixels. On the other hand, when border ruled lines formed by a texture are detected by the ruled-line detection method using the edge-extraction technique, the amount of false extraction of non ruled lines, such as characters in an image, increases.

Related technologies are disclosed by Japanese Unexamined Patent Application Publication No. 10-40333 and Japanese Unexamined Patent Application Publication No. 01-217583.

SUMMARY

According to an aspect of an embodiment, a method of detecting boundary line information contained in image information comprising a plurality of pixels in either one of first and second states, comprising: detecting a first group of pixels in the first state disposed continuously in said image information to determine first line information and detecting a second group of pixels in the first state disposed adjacently with each other and surrounded by pixels in the second state to determine edge information based on the contour of the second group of pixels; and determining the boundary line information on the basis of the information of the relation of relative position of the line information and the edge information and the size of the first and second group of pixels.

DESCRIPTION OF THE PREFERRED EMBODIMENT

An embodiment of the present invention will be described below.

Figure 1:
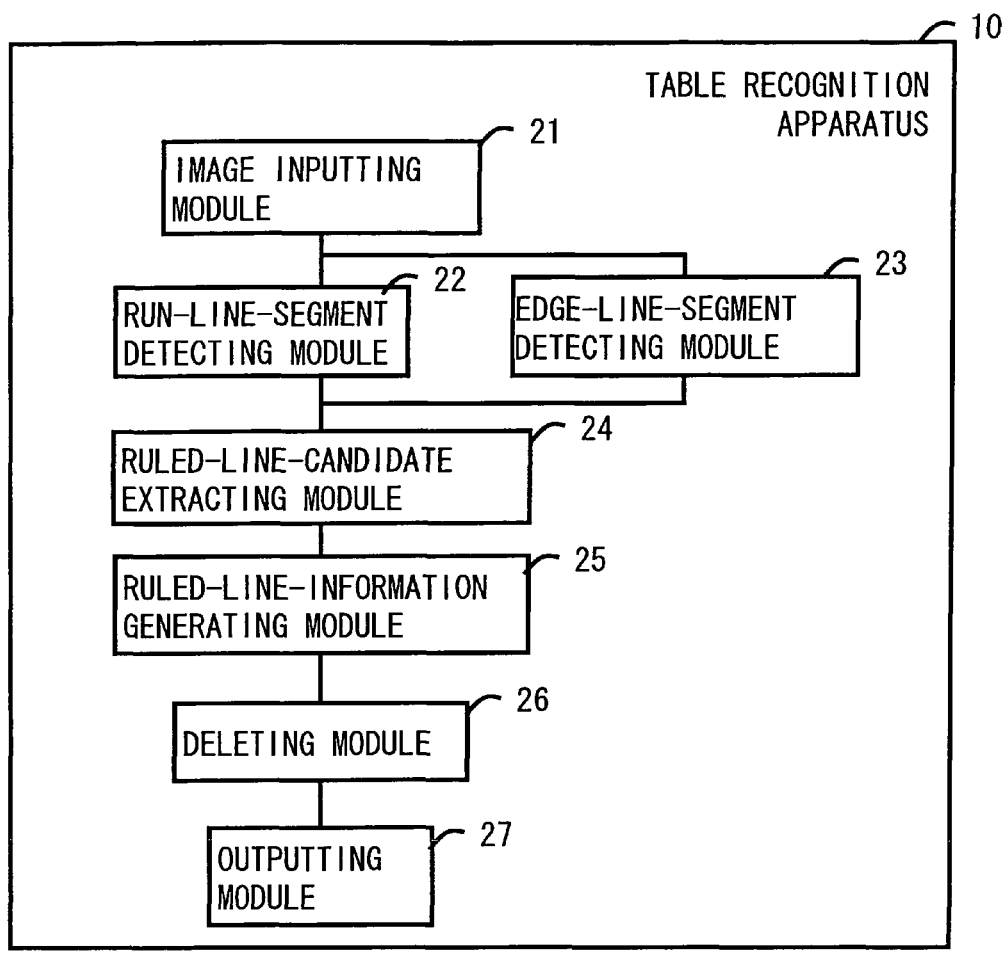
FIG. 1 is a block diagram showing the principle according to an embodiment of the present invention.

FIG. 1 is a block diagram showing a principle of an embodiment of the present invention. In response to document-image data, a table recognition apparatus 10 performs the following processing on the document-image data and outputs table ruled-line (boundary line) information. Image inputting module 21 obtains input document-image data. Run-line-segment detecting module 22 performs run-length processing to detect ruled-line candidates in the document-image data. Edge-line-segment detecting module 23 performs edge-detection processing to detect ruled-line candidates in the document-image data.

Ruled-line-candidate extracting module 24 superimposes the ruled-line candidates detected by the run-line-segment detecting module 22 and the ruled-line candidates obtained by the edge-line-segment detecting module 23 to determine a type of ruled-line candidate in accordance with predetermined conditions. In accordance with the type of ruled-line candidate, ruled-line-information generating module 25 determines whether or not the ruled-line candidates are ruled-line information. Deleting module 26 deletes inappropriate ruled-line information in items in the table. Outputting module 27 outputs table ruled-line information ultimately detected from the document-image data.

Figure 2:
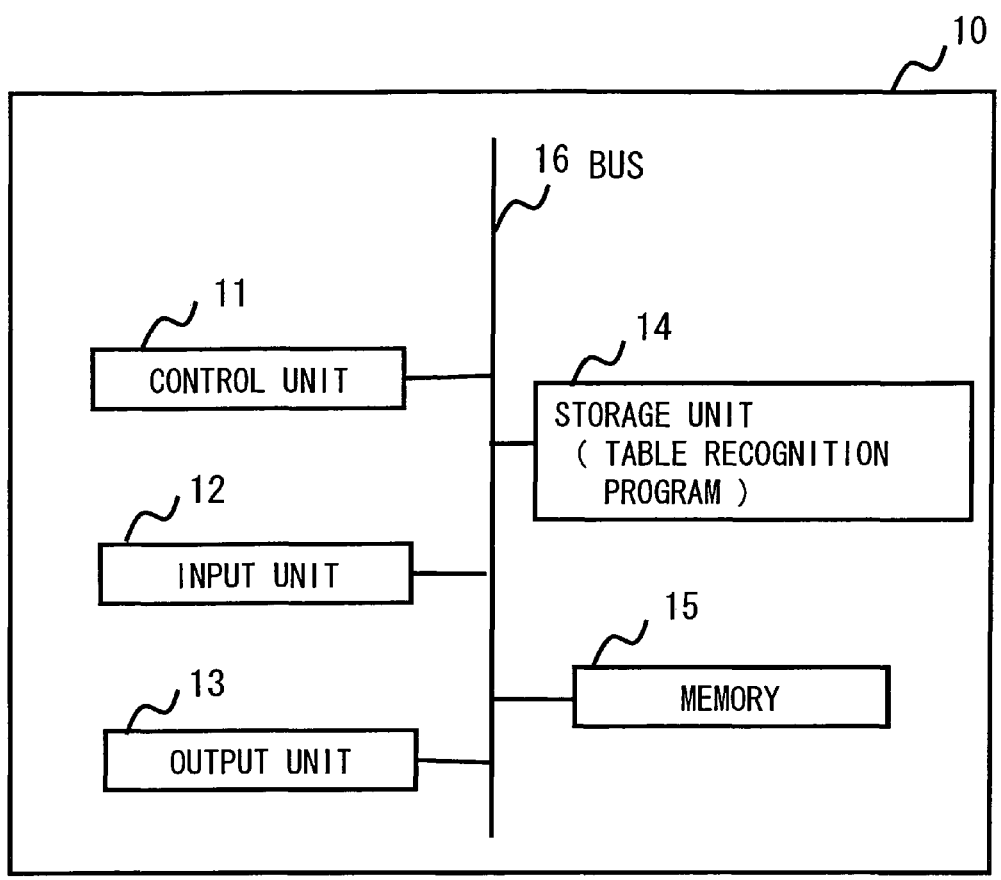
FIG. 2 is a block diagram of the hardware of a table recognition apparatus in the present embodiment.

FIG. 2 is a block diagram of the hardware of the table recognition apparatus 10 of the present embodiment. The table recognition apparatus 10 includes a control unit 11, an input unit 12, an output unit 13, a storage unit 14, and a memory 15. The individual units are interconnected through a bus 16. The control unit 11 serves as a central processing device that controls the entire table recognition apparatus 10. The control unit 11 is, for example, a CPU (central processing unit). The control unit 11 executes the processing shown in FIG. 1 by using a table recognition program 1, data, and so on loaded in the memory 15.

The input unit 12 has a function for receiving document-image data to be processed. The input unit 12 is, for example, a scanner, a network interface, a keyboard, a mouse, a touch pane, or the like. The network interface allows the control unit 11 to transmit/receive data to/from an external computer apparatus through a network (e.g., the Internet or a LAN). The output unit 13 has a function for outputting table ruled lines in the document-image data. The output unit 13 is, for example, a monitor, a printer, and a display apparatus such as a network interface.

The storage unit 14 stores the table recognition program 1. The storage unit 14 is, for example, a magnetic disk device or a ROM (read only memory). The memory 15 is an area for temporarily storing the table recognition program 1 stored in the storage unit 14, data of computation results, and so on to allow the control unit 11 to execute the table recognition program 1. The memory 15 is, for example, a RAM (random access memory).

The control unit 11 loads the table recognition program 1, stored in the storage unit 14, into the memory 15. Based on the table recognition program 1, the control unit 11 functions as the image inputting module 21, the run-line-segment detecting module 22, the edge-line-segment detecting module 23, the ruled-line-candidate extracting module 24, the ruled-line-information generating module 25, the deleting module 26, and the outputting module 27.

The document-image data input in the present embodiment contains a table. The table recognition apparatus 10 extracts ruled lines in the table. For example, when the document image input to the table recognition apparatus 10 is ledger-report data, the table recognition apparatus 10 recognizes a table in the ledger report.

The image inputting module 21 will now be described. The image inputting module 21 achieves a function for reading the document-image data into the apparatus. For example, for reading an image from a paper document, the inputting module 21 obtains document-image data digitized by an optical scanner. For example, when document-image data is already stored in the storage unit 14 or the like, the image inputting module 21 obtains the document-image data therefrom.

Figure 3:
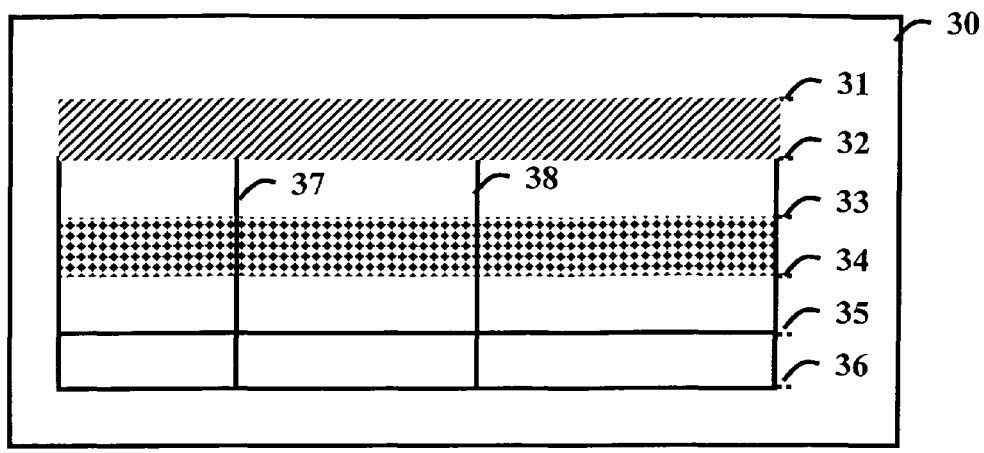
FIG. 3 is a table in document-image data input in the present embodiment.

FIG. 3 is a table 30 in document-image data input in the present embodiment. The table 30 has various forms of ruled lines. The ruled line is expressed by a shape, pattern, or color or a combination of a shape, pattern, and color. The table ruled lines include border ruled lines 31 and 32, which are formed by borders of an area, texture-border ruled lines 33 and 34, which are formed by borders of a texture area, and solid-line ruled lines 35, 36, 37, and 38, which are formed by solid lines.

Figure 4:
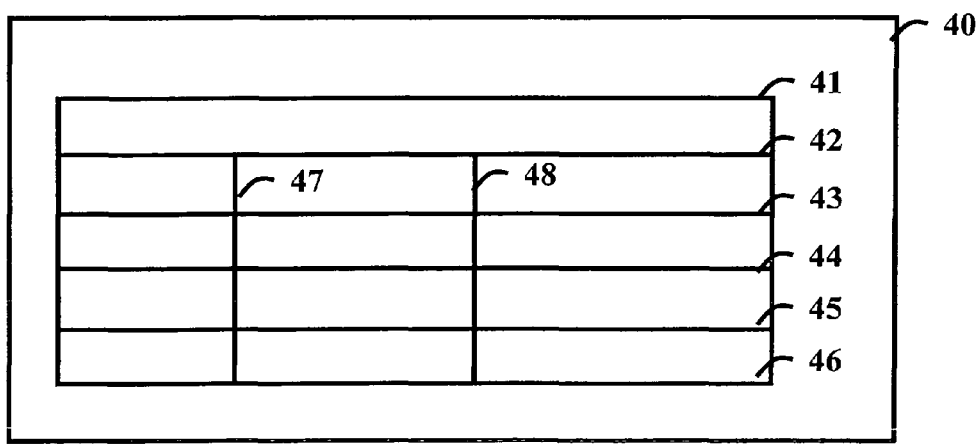
FIG. 4 is a table output from the table of FIG. 3 according to the present embodiment.

FIG. 4 shows a table 40 output from the table 30 in the present embodiment. Table ruled lines 41, 42, 43, 44, 45, 46, 47, and 48 are extracted as solid lines. The ruled lines 35, 36, 37, and 38 and the border ruled lines 31 and 32, which are formed the solid lines, are formed of border lines of areas filled with the same type of pixels (i.e., fully painted areas), and thus can be detected by the run-line-segment detecting module 22 and the edge-line-segment extracting module 23. On the other hand, the run-line-segment detecting module 22 cannot extract the texture-border ruled lines 33 and 34. Thus, an edge extraction technology needs to be used in order to extract ruled lines as in the table 40 from the table 30 in which multiple types of ruled lines coexist, as shown in FIG. 3. A description in the present embodiment will be described using the Canny method, which is one example of edge-extraction technology.

Processing executed by the run-line-segment detecting module 22 will now be described. The run-line-segment detecting module 22 in the present embodiment digitizes each pixel in the document-image data based on whether it is white or black. Hereinafter, a digitized pixel in white is referred to as a "white pixel", and a digitized pixel in black is referred to as a "black pixel". The run-line-segment detection is generally referred to as "run-length processing". In the run-length processing, an area in which a predetermined number of black pixels or more continue in a vertical or horizontal direction is extracted as a run-line-segment area. Thus, an area in which black pixels continue linearly is extracted in the run-length processing.

Figure 5:
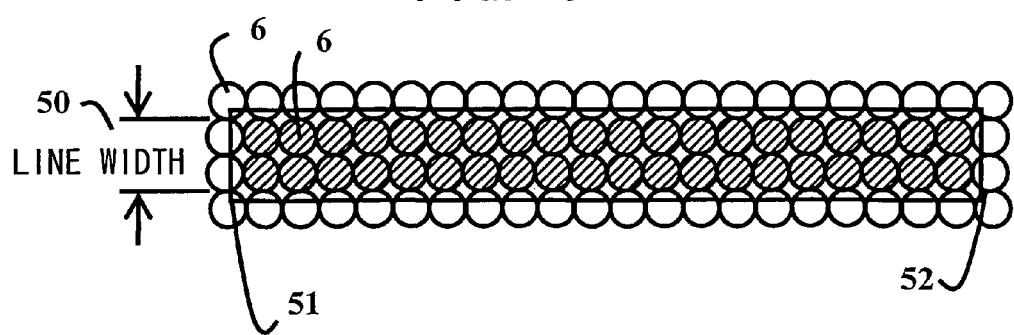
FIG. 5 is a diagram showing the principle of run-length processing.

FIG. 5 is a diagram showing the principle of the run-length processing. In the run-length processing, pixels 6 in image data are digitized, and a pixel group of the same kind is extracted, so that a line width 50, a start point 51, and an end point 52 of a line segment formed of the pixel group of the same kind are obtained.

Figure 6:
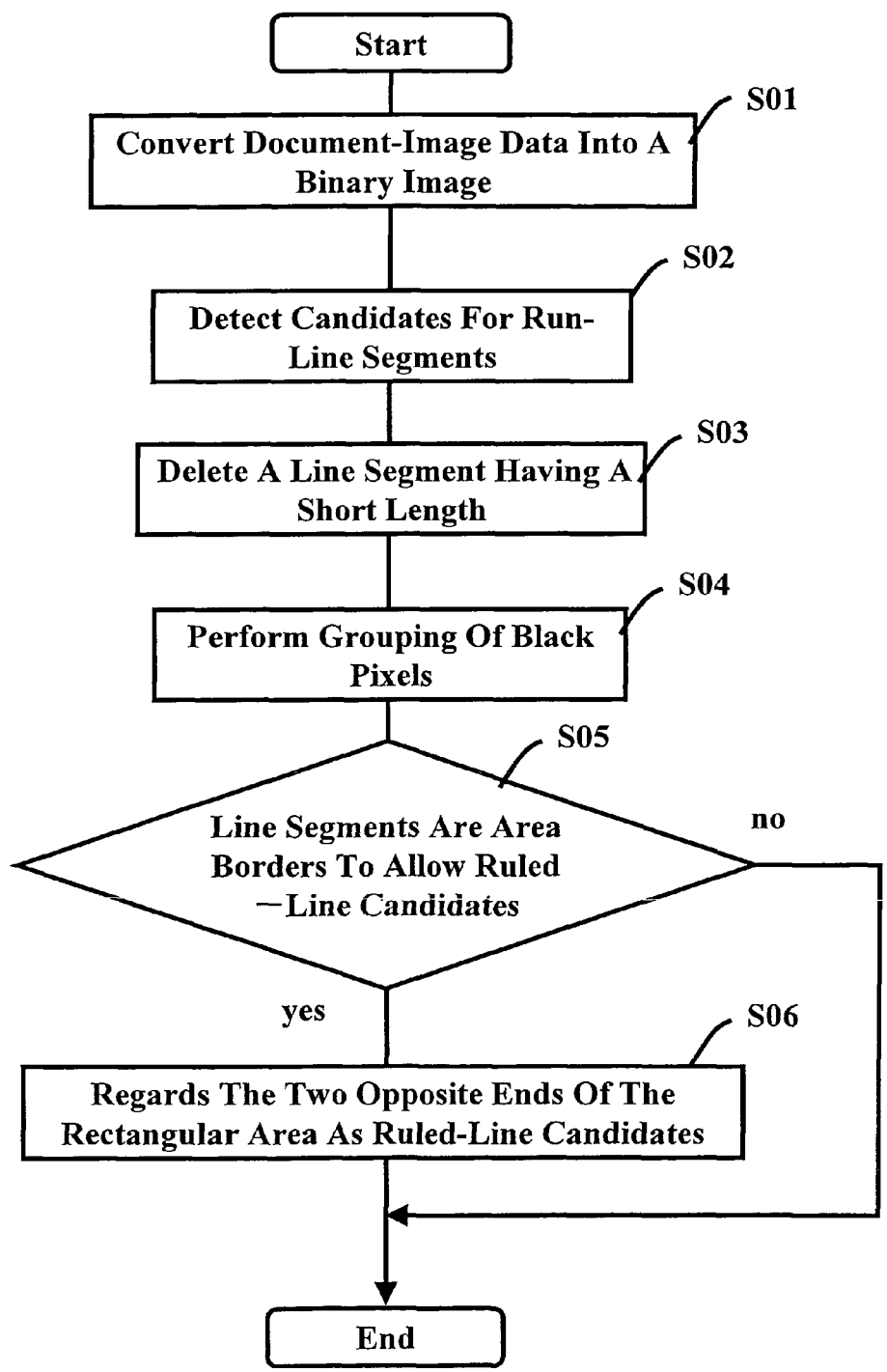
FIG. 6 is flowchart of processing executed by run-line-segment detecting module.

FIG. 6 is a flow chart of processing executed by the run-line-segment detecting module 22. The run-line-segment detecting module 22 converts document-image data, obtained by the image inputting module 21, into a binary image (in step S01). The run-line-segment detecting module 22 detects areas in which black pixels continue linearly as candidates for run-line segments (in step S02). The run-line-segment detecting module 22 groups continuous pixels for each row consisting of pixels to detect a horizontal run-line-segment candidate. The run-line-segment detecting module 22 deletes a line segment having a length that is less than or equal to a predetermined value (in step S03).

Figure 7:
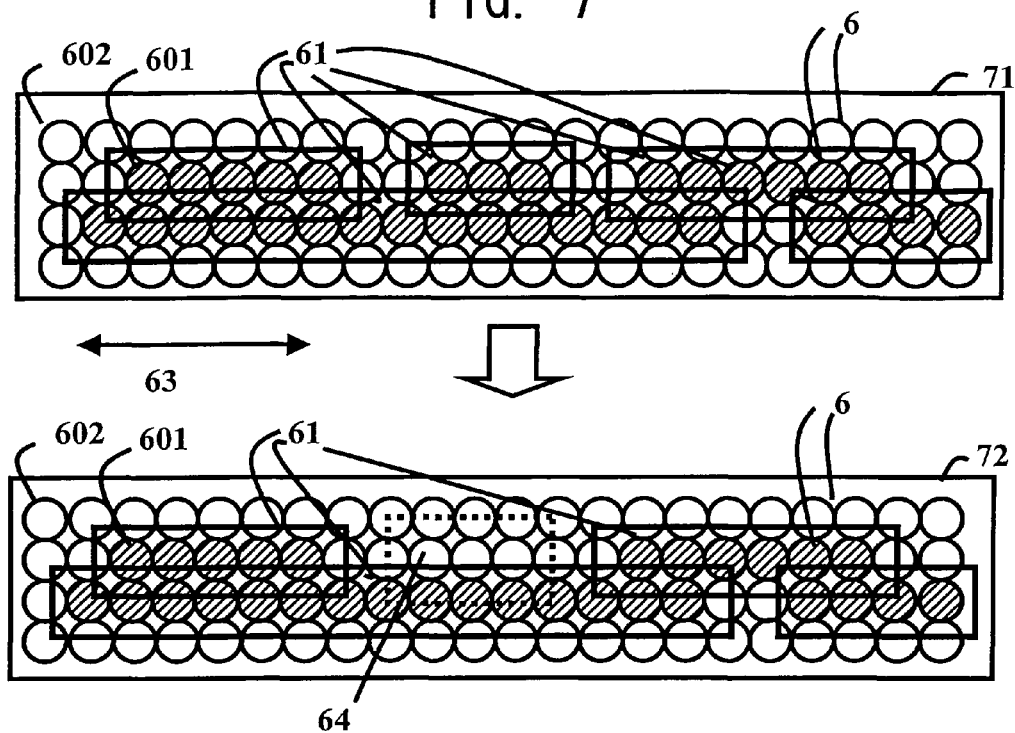
FIG. 7 is diagram showing a state in which a run-line-segment candidate is deleted.

FIG. 7 is a diagram showing a state in which a run-line-segment candidate is deleted. An upper part 71 in FIG. 7 shows a state in which the run-line-segment detecting module 22 extracts run-line-segment candidates from the document-image data in step S02. A lower part 72 shows a state in which the run-line-segment detecting module 22 deletes a run line segment from the run-line-segment candidates in step S03. Circles in FIG. 7 indicate pixels 6. Pixels 6 in black are represented by black pixels 601 and pixels 6 in white are represented by white pixels 602. The run-line-segment detecting module 22 deletes, of run-line-segment candidates 61, a run-line-segment candidate having three pixels or less that continue in a horizontal direction 63. As a result, a pixel group 64 that exists in the vicinity of the center in the lower state-diagram in FIG. 7 and that corresponds to the run-line-segment candidate having a length of 3 pixels is deleted. A description will now be given with reference back to FIG. 6.

Figure 8:
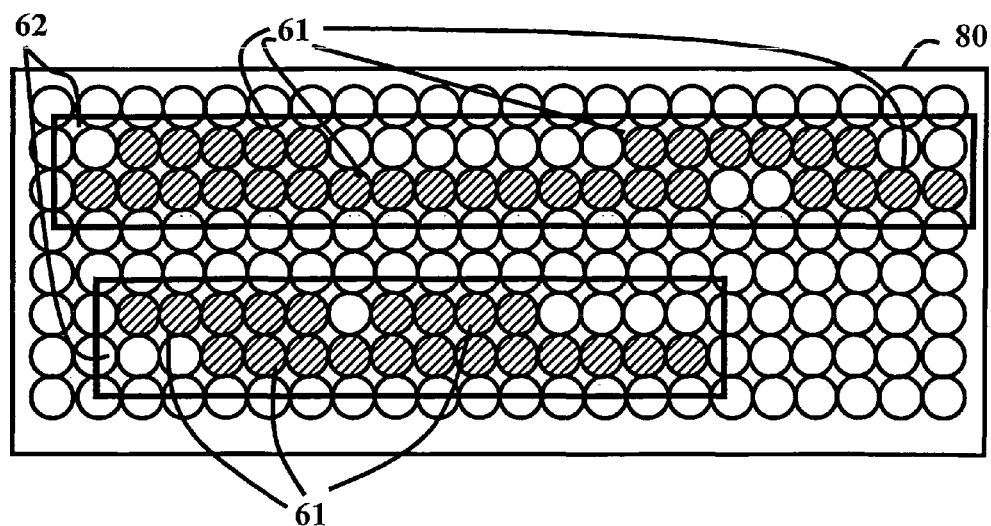
FIG. 8 is a diagram showing a state in which black pixels are grouped.

Next, the run-line-segment detecting module 22 performs grouping of black pixels (in step S04). FIG. 8 is a diagram illustrating a state in which black pixels are grouped. The run-line-segment detecting module 22 groups adjacent run-line-segment candidates 61 in the document-image data into groups to detect rectangular areas 62 in which the run-line-segment candidates 61 are coupled. The run-line-segment detecting module 22 regards, as ruled-line candidates, the rectangular areas 62 in which the run-line-segment candidates 61 are coupled. As a result of the processing described above, a solid-line ruled line is extracted.

Next, the run-line-segment detecting module 22 determines whether or not line segments of interest are area borders to allow ruled-line candidates to be detected from border ruled lines (in step S05). Specifically, when the width of the rectangular area of black pixels exceeds a predetermined threshold, the run-line-segment detecting module 22 determines that the rectangular the line segments of interest are area borders. Ruled-line candidates of the area borders correspond to border portions at two opposite ends of a rectangular area. For area borders (Yes in step S05), the run-line-segment detecting module 22 regards the two opposite ends of the rectangular area as ruled-line candidates (in step S06).

Figure 9:
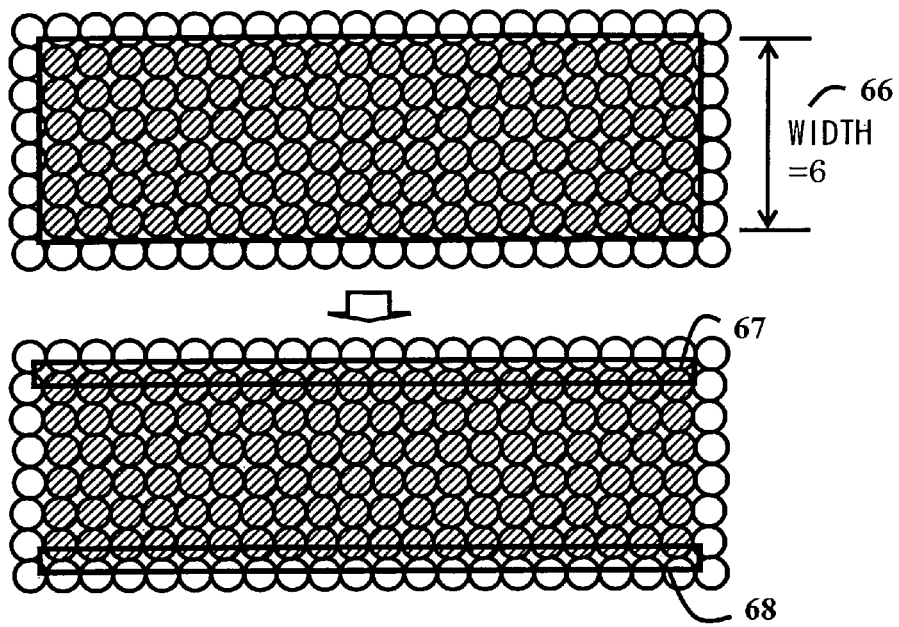
FIG. 9 is an example of setting ruled-line candidates of a border area.

FIG. 9 is an example of setting ruled-line candidates of an area border. The upper part in FIG. 9 shows a rectangular area of grouped black pixels. A width 66 of a black-pixel line segment consists of six pixels. The run-line-segment detecting module 22 generates area borders from the group of black pixels. The run-line-segment detecting module 22 is assumed to have a predetermined value, for example, "4" as threshold information for determining whether line segments are area borders. When the number of pixels, which serves as the width of a black-pixel line segment, is 4 or more, the run-line-segment detecting module 22 determines that the line segments are area borders. Upon determining that the line segments are area borders, the run-line-segment detecting module 22 determines that the border between the white pixels and the black pixels at the upper edge of the rectangular area is a ruled-line candidate 67 and determines that the border between the white pixels and the black pixels at the lower edge of the rectangular area is a ruled-line candidate 68, as shown at the lower part in FIG. 9.

In the above-described processing, the run-line-segment detecting module 22 detects horizontal ruled-line candidates. The run-line-segment detecting module 22 also detects vertical ruled-line candidates. In the latter case, the run-line-segment detecting module 22 changes the directions of a vertical ruled line and a horizontal ruled line to execute the processing. As a result of the processing described above, the run-line-segment detecting module 22 extracts ruled-line candidates of run line segments of solid-line ruled lines and border ruled lines.

Figure 10:
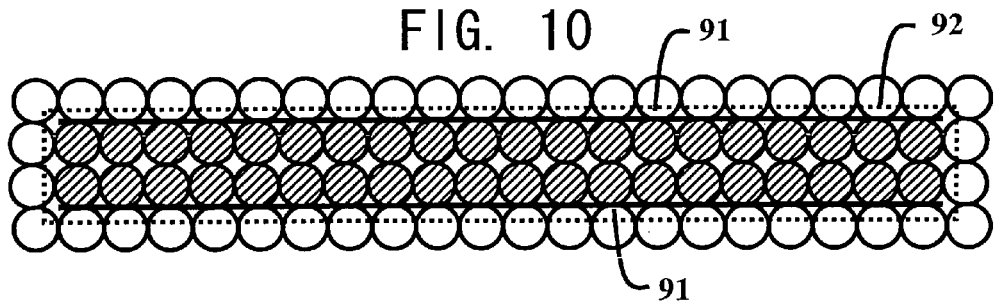
FIG. 10 is a diagram illustrating edge extraction.

Processing performed by the edge-line-segment detecting module 23 will now be described. FIG. 10 is a diagram illustrating edge extraction.

In the edge extraction, pixel borders 91 at two opposite sides of a straight line 92 formed of black pixels are extracted as lines. In other words, in the edge extraction, two line segments at two opposite sides of a straight line 92 formed of a series of pixels are extracted.

Figure 11:
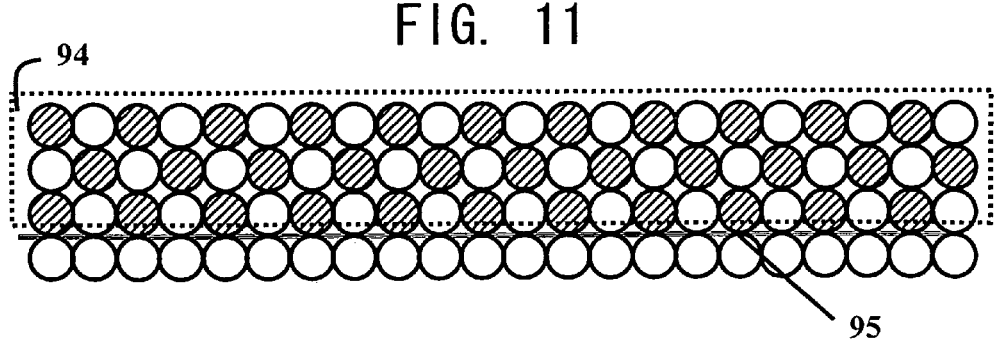
FIG. 11 is a diagram illustrating a border of a texture area 94, the border being detected in the edge extraction.

The edge-line-segment detecting module 23 needs to have a function for extracting texture-area borders. FIG. 11 is a diagram illustrating a border of a texture area 94, the border being detected in the edge extraction. A border line 95 needs to be detected from the texture area 94 in which black pixels are discontinuous. In the present embodiment, an edge extraction method called the Canny method is used. In the Canny method, pixel-value variations due to a fine pattern in a texture area are regarded as noise superimposed on a fully painted area. First, an input image is smoothed by a Gaussian filter and the resulting fine pattern is spread to an area that is uniform to some extent. Thereafter, varied values of the pixel values are determined by a Sobel filter or the like, and a maximum value of the determined values is regarded as an edge pixel. Lastly, pixels having large gradient values in the vicinity of the edge pixel are coupled and the resulting edge is obtained a continuous line drawing.

Figure 12:
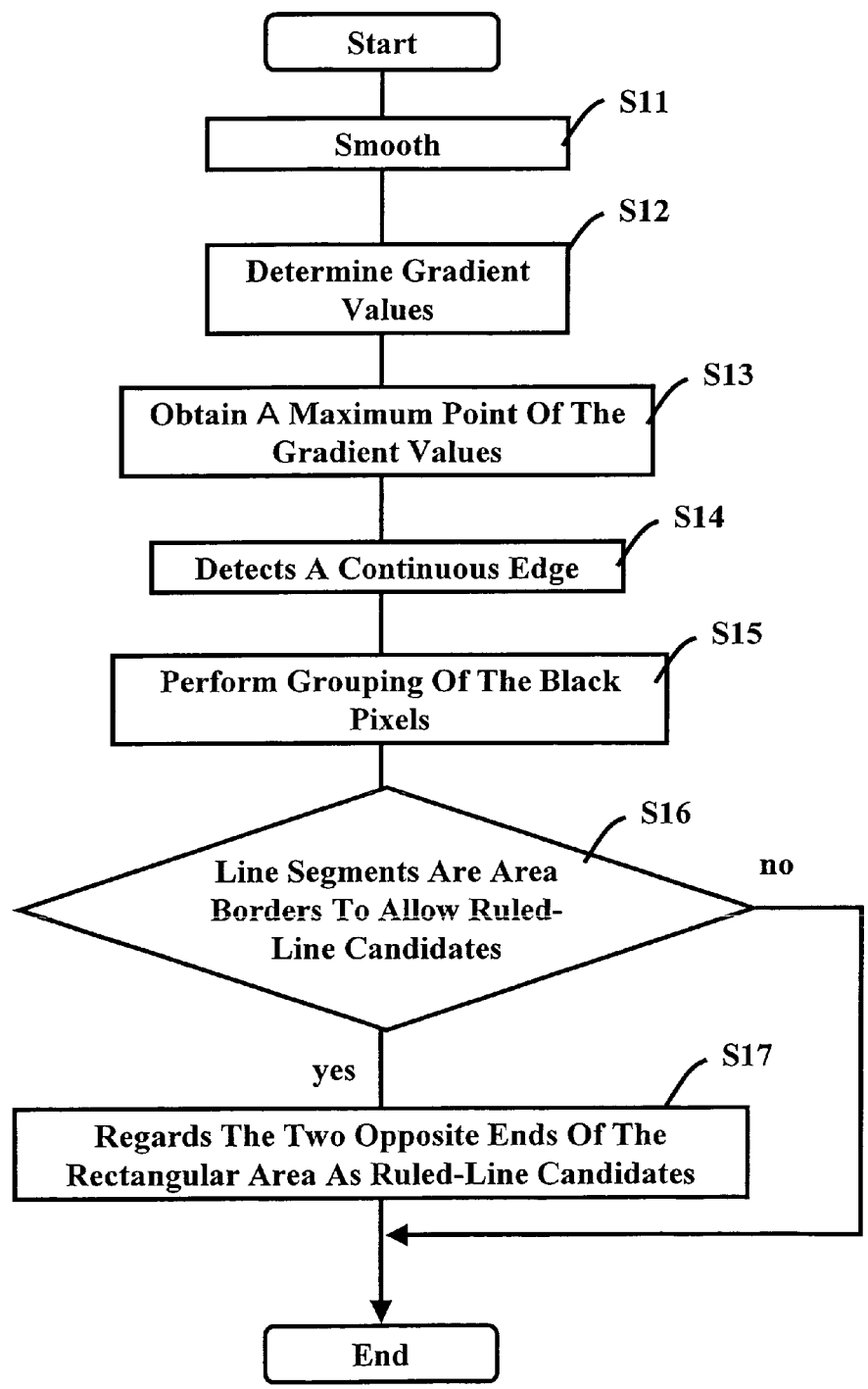
FIG. 12 is a flowchart of processing performed by edge-line-segment extracting module using the Canny method.
Figure 13:
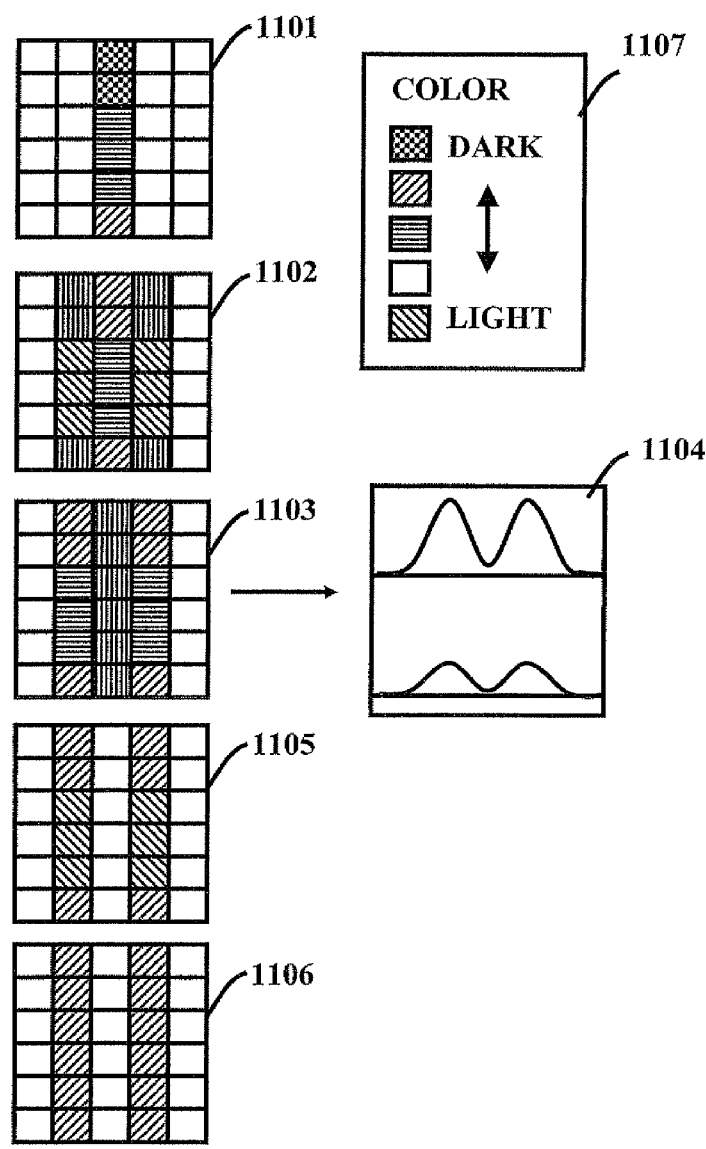
FIG. 13 is a diagram illustrating states of processing in steps in the flowchart of FIG. 12.

FIG. 12 is a flowchart of processing performed by the edge-line-segment extracting module 23 using the Canny method. FIG. 13 is a diagram illustrating states of processing in steps in the flowchart of FIG. 12. In the present embodiment, document-image data obtained by the image inputting module 21 is assumed to contain an image with a minimum density of 0 and a maximum density of 255. A table 1107 shows a color of each of pixels in a state 1101, 1102, 1103, 1105, 1106, and 1107.

Figure 14:
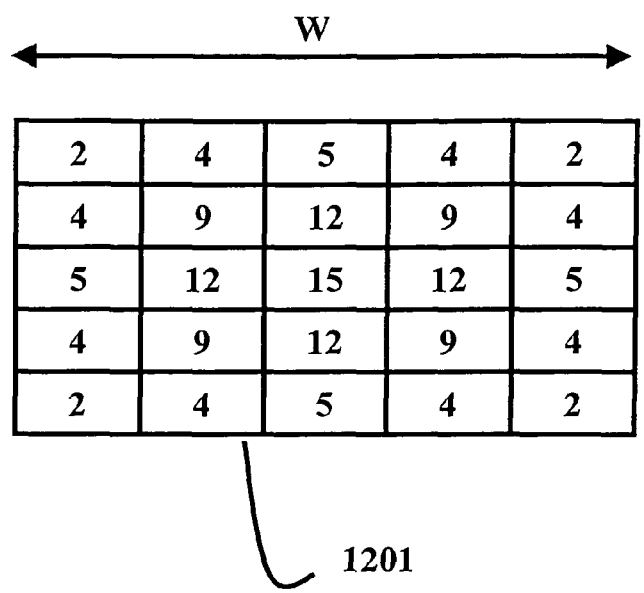
FIG. 14 is an example of coefficients of a Gaussian filter.

The edge-line-segment detecting module 23 smoothes pixels in document-image data shown in a state 1101 in FIG. 13 and obtained by the image inputting module 21 (in step S11). For example, a Gaussian filter is used as module for smoothing the image, and the smoothed image can be obtained by a convolution sum of an input image and a Gaussian filter. FIG. 14 is an example of coefficients 1201 of the Gaussian filter. A smoothed image I' (i, j) can be realized by computation as represented by (equation 1) where I (i, j) indicates an input image, F (i, j) indicates a filter coefficient, and C indicates a normalization constant.

$$I'(x, y) = C \sum_{i=0}^{w*2+1} \{I(x - w + i, y - w + j) \times F(i, j)\} \quad \text{(equation 1)}$$

When the height and width of the filter are indicated by W, w is determined from the following (equation 2).

$$w = (W-1)/2 \quad \text{(equation 2)}$$

In this case, W is "5". When W is "5", w is determined to be "2"

In this case, a value (C=159) obtained by adding all values of the coefficients of the filter elements shown in FIG. 14 is used as the normalization constant C. A state 1102 shown in FIG. 13 represents a state in which the state 1101 is smoothed.

Figure 15:
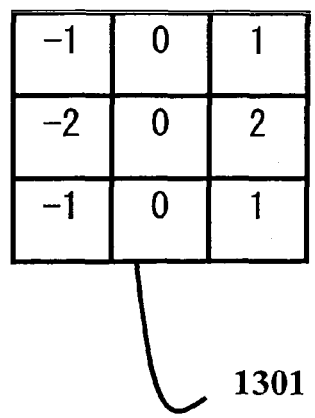
FIG. 15 shows a Sobel filter for detecting an edge in a horizontal direction.
Figure 16:
FIG. 16 shows a Sobel filter for detecting an edge in a vertical direction.

The edge-line-segment detecting module 23 determines gradient values (in step S12). When a numeric-value difference relative to adjacent pixels at two opposite sides is large, the gradient value of the pixel of interest is large. The gradient values are obtained by, for example, a Sobel filter. FIG. 15 shows a Sobel filter 1301 for detecting an edge in a horizontal direction. FIG. 16 shows a Sobel filter 1401 for detecting an edge in a vertical direction. For example, for extraction of a horizontal ruled-line candidate, the Sobel filter 1401 (shown in FIG. 16) for detecting an edge in the vertical direction is used. On the other hand, for extraction of a vertical ruled-line candidate, the Sobel filter 1301 (shown in FIG. 15) for detecting an edge in the horizontal direction is used. Specifically, the edge-line-segment detecting module 23 uses coefficients shown in FIG. 15 or 16 as the filter coefficient in equation (1) and uses "1" for the constant C to perform computation of the pixels. A method in which a Laplacian filter is used to obtain edges is also available. The state 1103 shown in FIG. 13 represents a state in which gradient values are obtained from the state 1102. When the state 1103 is viewed from the side, a state 1104 is obtained. The edge-line-segment detecting module 23 obtains a maximum point of the gradient values (in step S13). For example, when the gradient value of the maximum point is greater than a predetermined threshold (e.g., an arbitrary numeric value, such as "1"), the edge-line-segment detecting module 23 confirms that the maximum point is a pixel included in an edge. Alternatively, the edge-line-segment detecting module 23 performs the confirmation by, for example, determining a point having a greater gradient value than adjacent points. The state 1105 in FIG. 13 represents a state in which the maximum point of the gradient values is obtained from the state 1103.

The edge-line-segment detecting module 23 detects a continuous edge (in step S14). For example, the edge-line-segment detecting module 23 detects a continuous edge by performing processing generally called the hysteresis processing. More specifically, when an unconfirmed pixel exists adjacent to the confirmed pixel included in an edge and the gradient value of the unconfirmed pixel is greater than a predetermined threshold (e.g., "2"), the edge-line-segment detecting module 23 confirms that the adjacent unconfirmed pixel is a pixel included in the edge.

Figure 17:
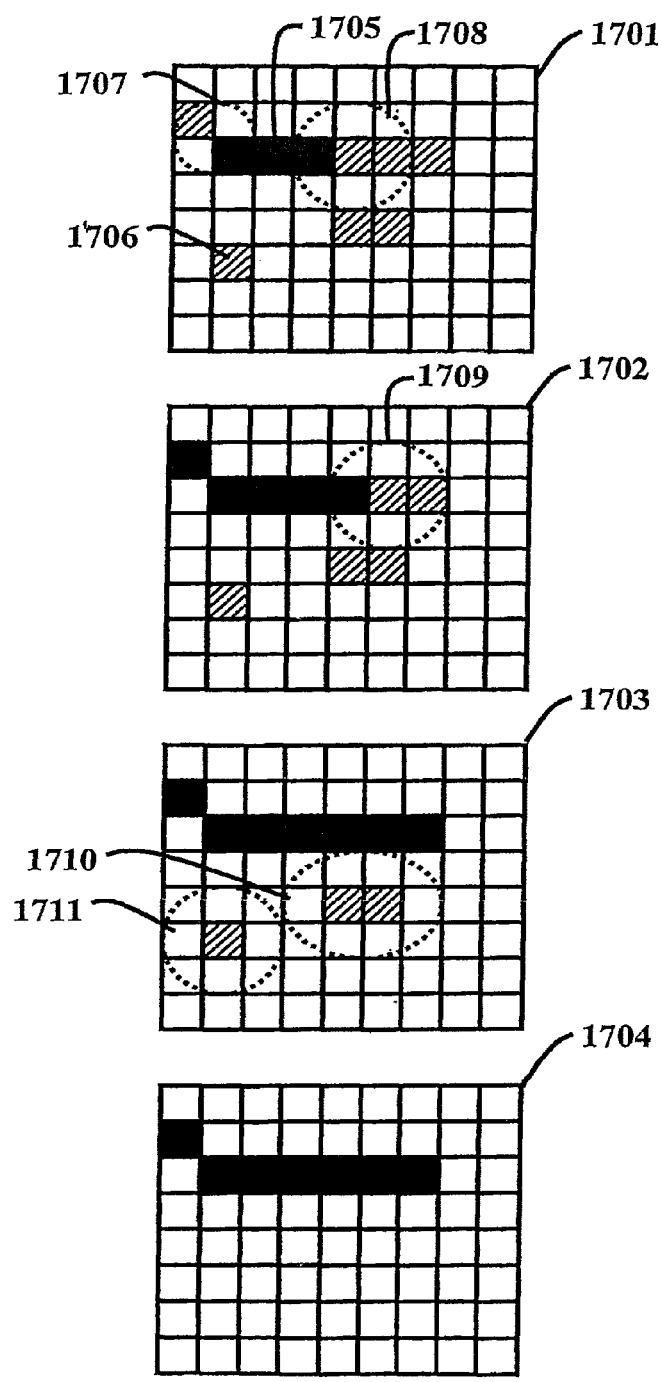
FIG. 17 is a diagram illustrating a case in which pixels included in an edge are identified by the hysteresis processing.

FIG. 17 is a diagram illustrating a case in which pixels included in an edge are confirmed by the hysteresis processing. In the hysteresis processing, a state 1701 shifts to, a state 1702, a state 1703, and a state 1704 in that order. In each state, black pixels 1705 are pixels confirmed as pixels included in an edge and hatched pixels 1706 are pixels that are unconfirmed and that have greater gradient values than a predetermined threshold. The edge-line-segment detecting module 23 sequentially confirms the hatched pixels 1706 adjacent to the black pixels 1705. In the state 1701, black pixels 1705 and hatched pixels 1706 are adjacent to each other in an area 1707 and an area 1708. When a black pixel 1705 and a hatched pixel 1706 are adjacent to each other, the edge-line-segment detecting module 23 regards the hatched pixel 1706 as a black pixel 1705. In a state 1702, a black pixel 1705 and a hatched pixel 1706 are adjacent to each other in an area 1709. The edge-line-segment detecting module 23 regards the hatched pixel 1706 as a black pixel 1705. In a state 1703, hatched pixels 1706 exist in areas 1710 and 1711. Since the areas 1710 and 1711 are not adjacent to any black pixel 1705, the edge-line-segment detecting module 23 deletes the hatched pixels 1706 in the areas 1710 and 1711. The above-described processing is continued until a pixel whose gradient value is greater than or equal to a predetermined value does not exist adjacent to pixels included in the edge. When the processing is completed, the edge-line-segment detecting module 23 detects the edge shown in the 1704. A state 1106 shown in FIG. 13 represents a state in which continuous edges are detected from the state 1105.

In essence, in the edge detection using the Canny method, during determination of a maximum point of gradients, the inclination direction of the gradients is checked and whether or not the gradient values of adjacent pixels exceed a predetermined threshold is checked along a direction orthogonal to the gradients.

The present embodiment, however, is intended to determine vertical and horizontal ruled lines included in a table. Thus, during processing for extracting horizontal ruled-line candidates, the edge-line-segment detecting module 23 sequentially detects a maximum value of the gradients of vertical adjacent pixels, and thereafter, sequentially checks a maximum value of the gradients of horizontal adjacent pixels. Processing for extracting vertical ruled lines is opposite to the above-described processing for extracting horizontal ruled lines.

The edge-line-segment detecting module 23 regards the edge pixels determined in the above-described processing as black pixels, and performs grouping of the black pixels (in step S15). Next, the edge-line-segment detecting module 23 determines whether or not line segments of interest are area borders to allow ruled-line candidates to be detected from border ruled lines (in step S16). When the line segments are area borders (Yes in step S15), the edge-line-segment detecting module 23 regards the two opposite ends of the rectangular area as ruled-line candidates (in step S17). Since the processing from S15 to S17 is the same as the processing performed by the run-line-segment detecting module 22, the description thereof is omitted.

Figure 18:
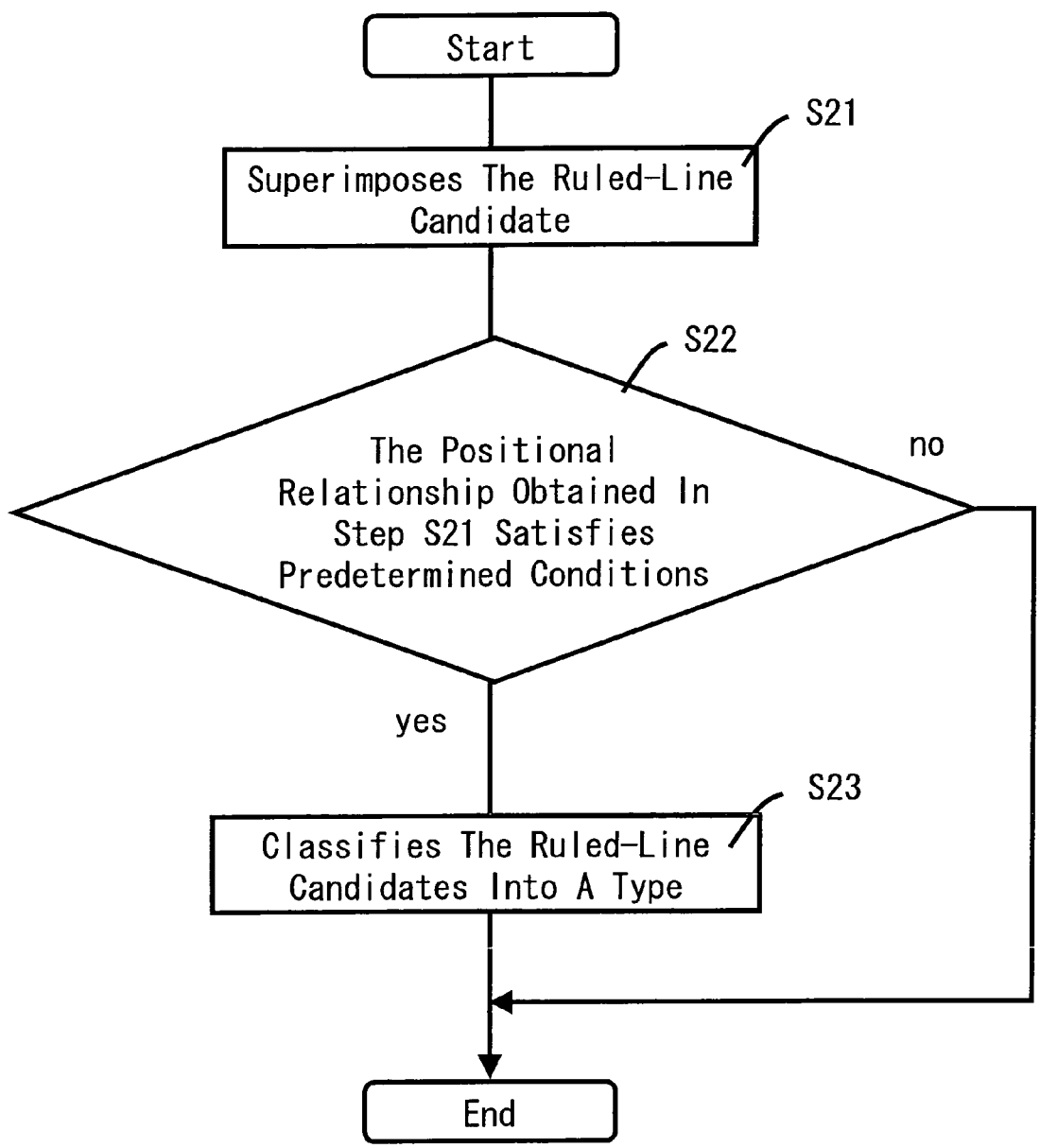
FIG. 18 is a flowchart of processing executed by ruled-line-candidate extracting module.

The ruled-line-candidate extracting module 24 will now be described. FIG. 18 is a flowchart of processing executed by the ruled-line-candidate extracting module 24.

Based on a positional relationship between the run-line-segment ruled-line candidate(s) detected by the run-line-segment detecting module 22 and the edge-line-segment ruled-line candidate(s) detected by the edge-line-segment detecting module 23, the ruled-line-candidate extracting module 24 extracts ruled-line information that can be determined as a ruled line from the ruled-line candidates. The ruled-line-candidate extracting module 24 superimposes the ruled-line candidate(s) obtained by the run-line-segment detecting module 22 and the ruled-line candidate(s) obtained by the edge-line-segment detecting module 23 to obtain a positional relationship of the ruled-line candidates obtained thereby (in step S21).

The ruled-line-candidate extracting module 24 determines whether or not the positional relationship obtained in step S21 satisfies predetermined positional-relationship conditions (in step S22). When the positional relationship satisfies the positional-relationship conditions (Yes in step S22), the ruled-line-candidate extracting module 24 classifies the ruled-line candidates into a type of ruled-line information (in step S23).

Figure 19:
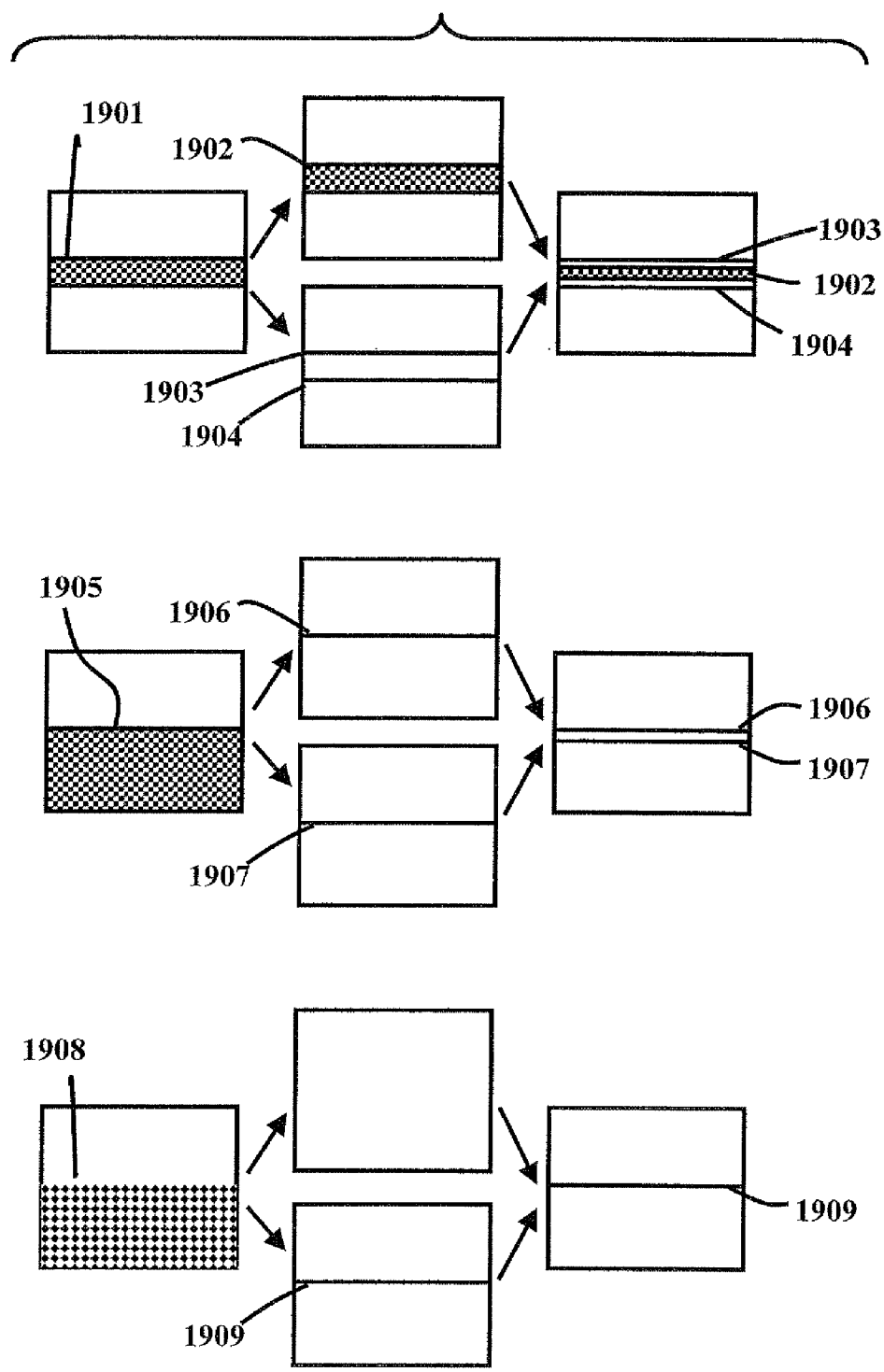
FIG. 19 illustrates relationships between ruled-line information positions determined from the positions of ruled-line candidates and types of ruled-line information.

The positional-relationship conditions will now be described. FIG. 19 illustrates relationships between ruled-line-information positions determined from the positions of ruled-line candidates and types of ruled-line information.

A ruled line in original document-image data is assumed to be a solid-line ruled line 1901. For the solid-line ruled line 1901, the run-line-segment detecting module 22 detects a ruled-line candidate 1902. The edge-line-segment detecting module 23 detects two ruled-line candidates 1903 and 1904. Superimposition of the ruled-line candidates 1902, 1930, and 1904 provides a positional relationship in which the ruled-line candidates 1903 and 1904 obtained by the edge-line-segment detecting module 23 sandwich the ruled-line candidate 1902 obtained by the run-line-segment detecting module 22. When a positional relationship in which edge line segments sandwich a run line segment, i.e., when edge line segments are adjacent to two opposite sides of a run line segment, the ruled-line-candidate extracting module 24 identifies the ruled-line candidates of interest as a solid-line ruled line.

Next, a ruled line in original document-image data is assumed to be a border ruled line 1905. For the boarder ruled line 1905, the run-line-segment detecting module 22 detects a ruled line candidate 1906. The edge-line-segment detecting module 23 detects a ruled-line candidate 1907. Superimposition of the ruled-line candidates 1906 and 1907 provides a positional relationship in which the ruled-line candidate 1907 obtained by the edge-line-segment detecting module 23 and the ruled-line candidate 1906 obtained by the run-line-segment detecting module 22 are adjacent to each other. For a positional relationship in which one edge line segment and one run line segment are adjacent to each other, the ruled-line-candidate extracting module 24 identifies the ruled-line candidates of interest as a border ruled line.

Next, a ruled line in original document-image data is assumed to be a texture-border ruled line 1908. For the texture boarder ruled line 1908, the run-line-segment detecting module 22 does not detect a ruled line candidate. On the other hand, the edge-line-segment detecting module 23 detects a ruled-line candidate 1909. Superimposition of the ruled-line candidate 1909 provides a positional relationship in which the ruled-line candidate 1909 obtained by the edge-line-segment detecting module 23 exists. For a positional relationship in which only an edge line segment exists, the ruled-line-candidate extracting module 24 identifies the ruled-line candidates of interest as a texture-border ruled line.

In this case, when the run-line-segment length of a ruled-line candidate obtained by the run-line-segment detecting module 22 and the edge-line-segment length of a ruled-line candidate obtained by edge-line-segment detecting module 23 are different from each other, the ruled-line-candidate extracting module 24 performs, for example, the following determination. When the length of a line segment detected by one of the run-line-segment detecting module 22 and the edge-line-segment detecting module 23 is greater than or equal to one half of the length of a line segment detected by the other detecting module 22 or 23, the positional-relationship determination in step S22 is performed. Alternatively, when the length of a line segment detected by one of the run-line-segment detecting module 22 and the edge-line-segment detecting module 23 is less than one half of the length of a line segment detected by the other detecting module 22 or 23, only the longer line segment is used as a valid line segment.

In addition, there are cases in which the positional relationship does not satisfy the conditions shown in FIG. 19, for example, a case in which two run line segments and two edge line segments are adjacent to each other. In such a case, when the adjacent line segments include a run line segment, the ruled-line-candidate extracting module 24 can detect a ruled line by identifying the line segments of interest as a solid-line ruled line, and when all of the run line segments are edge line segments, the ruled-line-candidate extracting module 24 can detect a ruled line by identifying the line segments of interest as ruled-line candidates obtained from a texture border.

Various types of ruled lines, for example, a dotted line and double lines, are possible in addition to those described above. Thus, the determination of the types of ruled-line candidates is not limited to the processing described above. For example, when three edge-line-segment ruled-line candidates and two run-line-segment ruled-line candidates alternately exist adjacent to each other in a document image, the ruled-line-candidate extracting module 24 can identify the ruled lines as double lines. Also, an edge line segment is likely to be extracted from a dotted line. Thus, when a single edge line segment is extracted and the area in the vicinity of a ruled-line candidate is a plain area, the ruled-line-candidate extracting module 24 can also determine that the line segment is likely to be a dotted line.

Figure 20:
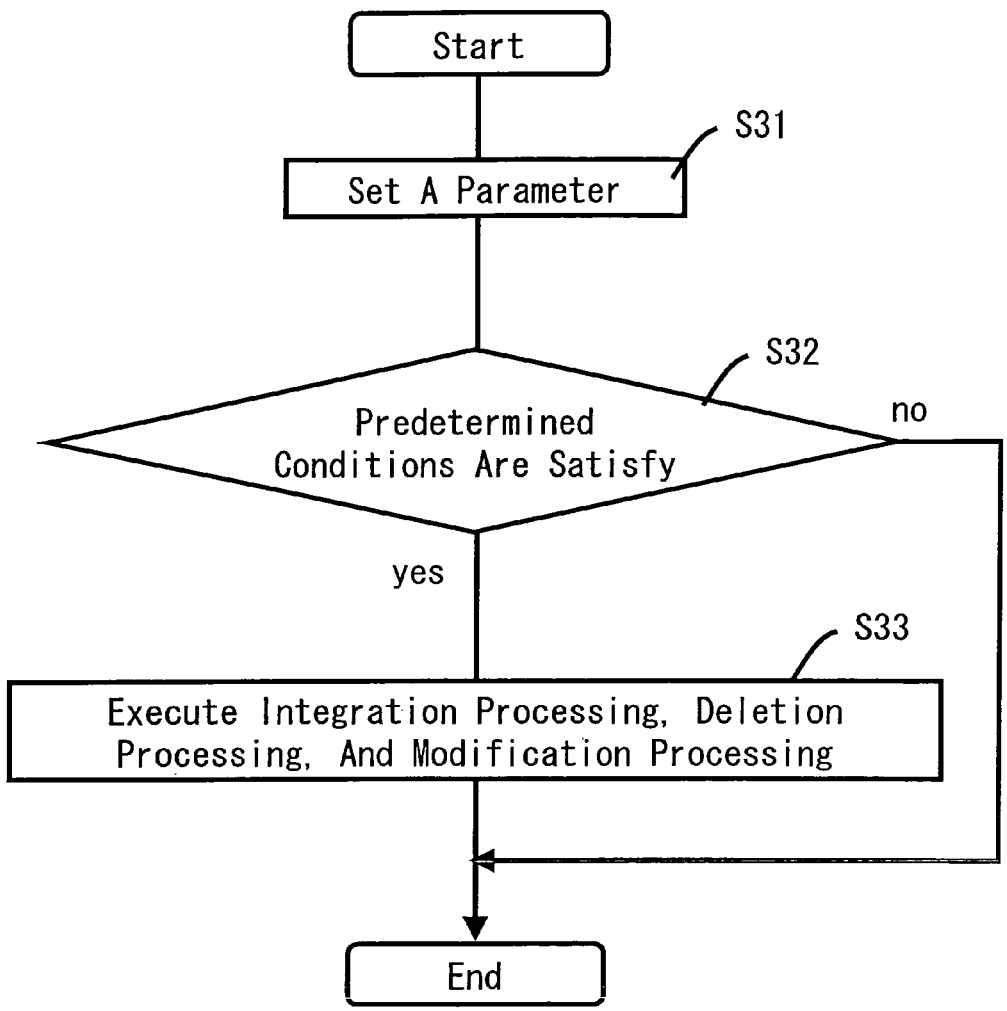
FIG. 20 is a flowchart of processing executed by ruled-line-information generating module.

The ruled-line-information generating module 25 will now be described. FIG. 20 is a flowchart of processing executed by the ruled-line-information generating module 25. The ruled-line-information generating module 25 generates ruled-line information from ruled-line candidates. More specifically, the ruled-line-information generating module 25 deletes inappropriate ruled-line candidates and integrates ruled-line candidates, and corrects ruled-line candidates. When an input document image itself is deteriorated, ruled lines in a table may be affected by color fading, color changes, and so on. When ruled lines in a table in the original document image are not correctly displayed, a result of extraction of a straight line included in the ruled lines may have a disconnection or deformation. Thus, the ruled-line-information generating module 25 performs processing, such as processing for extracting a line segment representing part or all of a straight line included in a ruled line and regarding the extracted line segment as a ruled-line candidate, processing for eliminating an unwanted ruled-line candidate, and processing for integrating adjacent ruled-line candidates together, to generate ruled-line information as a final result of the ruled-line extraction.

The ruled-line-information generating module 25 sets a predetermined parameter in accordance with the type of ruled-line candidates extracted by the ruled-line-candidate extracting module 24 (in step S31). The parameter is used to generate ruled-line information from the ruled-line candidates. For example, when two ruled-line candidates exist in parallel to each other, the parameter serves as a threshold for determining whether to regard the two ruled-line candidates as integrated one ruled line. An optimum value of the parameter differs depending on the type of ruled-line candidates. Thus, the ruled-line-information generating module 25 has a different parameter value depending on the type of ruled-line candidates.

An example of the parameter of the ruled-line-information generating module 25 will now be described. The ruled-line-information generating module 25 is adapted to determine whether or not ruled-line candidates are obtained from a ruled line, based on the relationship of the ruled-line-candidate length information and the threshold. In the parameter, the threshold for identifying ruled-line candidates obtained from a texture border as a ruled line is set to twice the threshold for determining ruled-line candidates obtained from a solid-line ruled line and a border ruled line as a ruled line. When the threshold for identifying a texture border as a ruled line is increased, a texture-border ruled line needs to be a longer straight line than a solid-line ruled line or a border ruled line in order to be regarded as a texture-border ruled line.

The reason why the threshold is increased is that, compared to a solid-line ruled line and a border ruled line, a texture-border ruled line is more likely to be ambiguous in position and is more likely to generate noise. Another reason why the threshold is increased is that another ruled line is less likely to exist in close vicinity of a texture border compared to cases of a solid-line ruled line and a border ruled line.

The ruled-line-information generating module 25 varies the detection parameter in accordance with the type of ruled-line candidates to thereby make it possible to prevent extraction of a wrong ruled line and disconnection of a ruled line. The ruled-line-information generating module 25 determines whether or not predetermined conditions are satisfied (in step S32). Upon determining that the predetermined conditions are satisfied (Yes in step S32), the ruled-line-information generating module 25 executes processing corresponding to the conditions (in step S33). Integration processing, deletion processing, and modification processing executed by the ruled-line-information generating module 25 will be described below.

A description will now be given of processing in which the ruled-line-information generating module 25 integrates adjacent ruled-line candidates together to generate one-ruled-line information.

The ruled-line-information generating module 25 determines whether or not to integrate ruled-line candidates together to generate a new ruled-line candidate. When part of the ruled-line candidates is deformed, the ruled-line-information generating module 25 recalculates the ruled-line width and length of entire ruled-line information. Regardless of the result of the recalculation of coordinate values, the ruled-line-information generating module 25 converts attributes, such as the coordinates and type of ruled line, into optimum values. As one example of the optimum values, the value of the threshold with which the ruled-line-information generating module 25 determines that adjacent ruled-line candidates are integrated into one ruled line when the distance between ruled-line candidates is small is increased when at least one of the ruled-line candidates is a texture-border ruled line. With this arrangement, the ruled-line-information generating module 25 can perform adjustment so as to facilitate integration of solid-line ruled-line candidates or border ruled-line candidates.

Figure 21:
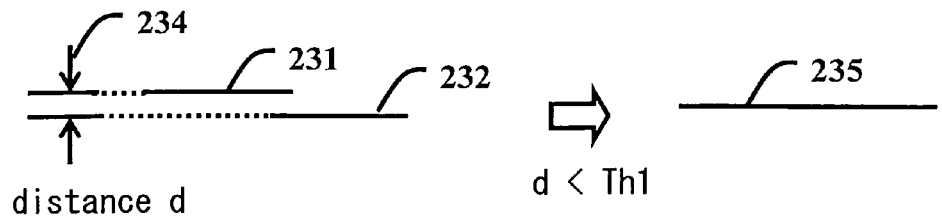
FIG. 21 is a first diagram illustrating integration of ruled-line candidates.

FIG. 21 is a first diagram illustrating integration of ruled-line candidates. When sections of ruled-line candidates partly overlap each other, the ruled-line candidates are integrated together. When a distance d 234 between two ruled-line candidates 231 and 232 is less than a threshold Th1, the ruled-line candidates 231 and 232 are integrated together and converted into one-ruled-line information 235.

Figure 22:
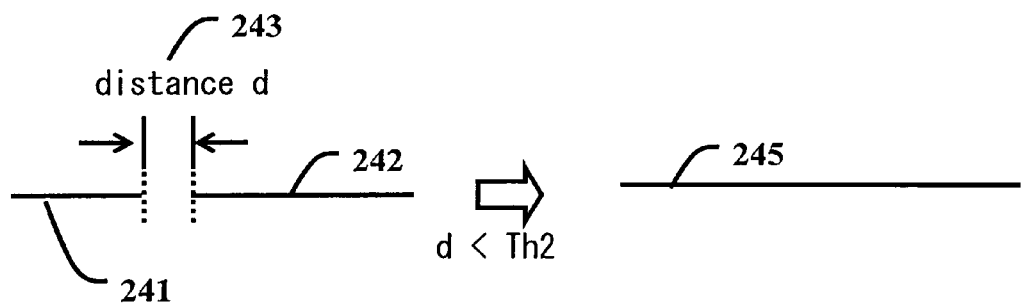
FIG. 22 is a second diagram illustrating integration of ruled-line candidates.

FIG. 22 is a second diagram illustrating integration of ruled-line candidates. FIG. 22 shows a positional relationship in which ruled-line candidates 241 and 242 lie along a straight line, not in parallel to each other. When a distance d 243 between two ruled-line candidates 241 and 242 is less than a threshold Th2, the ruled-line candidates 241 and 242 are integrated together and converted into one-ruled-line information 244.

Figure 23:
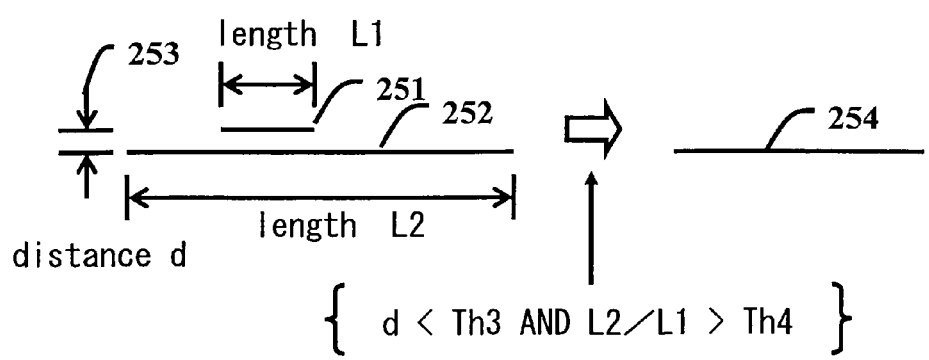
FIG. 23 is a third diagram illustrating integration of ruled-line candidates.

FIG. 23 is a third diagram illustrating integration of ruled-line candidates. FIG. 23 shows a positional relationship in which a short ruled-line candidate 251 and a long ruled-line candidate 252 lie in parallel to each other. In the present embodiment, two types of threshold, Th3 and Th4, are used. The short ruled-line candidate 251 has a length L1 and the long ruled-line candidate 252 has a length L2. When a distance d 253 between the two ruled-line candidates 251 and 252 is less than the threshold Th3 and the ratio of the length L2 of the ruled-line candidate 252 to the length L1 of the ruled-line candidate 251 is greater than the threshold Th4, the two ruled-line candidates are integrated together and converted into one-ruled-line information 254. More specifically, the ruled-line-information generating module 25 deletes the ruled-line candidate 251. In this case, the length L1 of the ruled-line candidate 251 and the length L2 of the ruled-line candidate 252 have a relationship in which L2 is greater than L1 to an extent that L1 can be regarded as noise of L2.

For example, when the input image has a resolution of about 200 dpi, setting is performed such that Th1=8 dots (about 0.1 mm), Th2=16 dots (about 0.2 mm), Th3=8 dots (about 0.1 mm), and Th4=5 dots (about 0.06 mm).

Alternatively, the ruled-line-information generating module 25 can also delete a ruled-line candidate having a length that is less than the threshold. Even when a ruled-line candidate of interest is not adjacent to another ruled-line candidate, the ruled-line-information generating module 25 deletes a ruled-line candidate having a length that is less than the predetermined threshold. Fore example, when the threshold is set to 20 dots, the ruled-line-information generating module 25 deletes a ruled-line candidate having a length of less than about 2.54 mm for 200 dpi. Since the length of a ruled line included in a table in document-image data typically has a certain lower limit, the use of the above-described threshold makes it possible to distinguish between a ruled-line candidate falsely extracted from a character and a ruled-line candidate extracted from a ruled line.

The ruled-line-information generating module 25 changes the attributes, such as the position and size of ruled-line information, based on the ruled-line candidates. For performing the change, the ruled-line-information generating module 25 has a function for determining whether or not to change the attributes in accordance with the type of ruled-line candidate, namely, a solid-line ruled line, a border ruled line, or a texture-border ruled line. For example, for a texture-border ruled-line candidate, the ruled-line-information generating module 25 checks whether or not areas that are in contact with the texture-border ruled-line candidate are texture areas. Only when one of the areas that are in contact with the texture-border ruled-line candidate is a texture area or only when two opposite areas that are in contact with the texture-border ruled-line candidate are two different types of texture areas, the ruled-line-information generating module 25 can perform setting so as to determine that the line segment of interest is a ruled-line candidate. This processing will be described below in detail.

Figure 24:
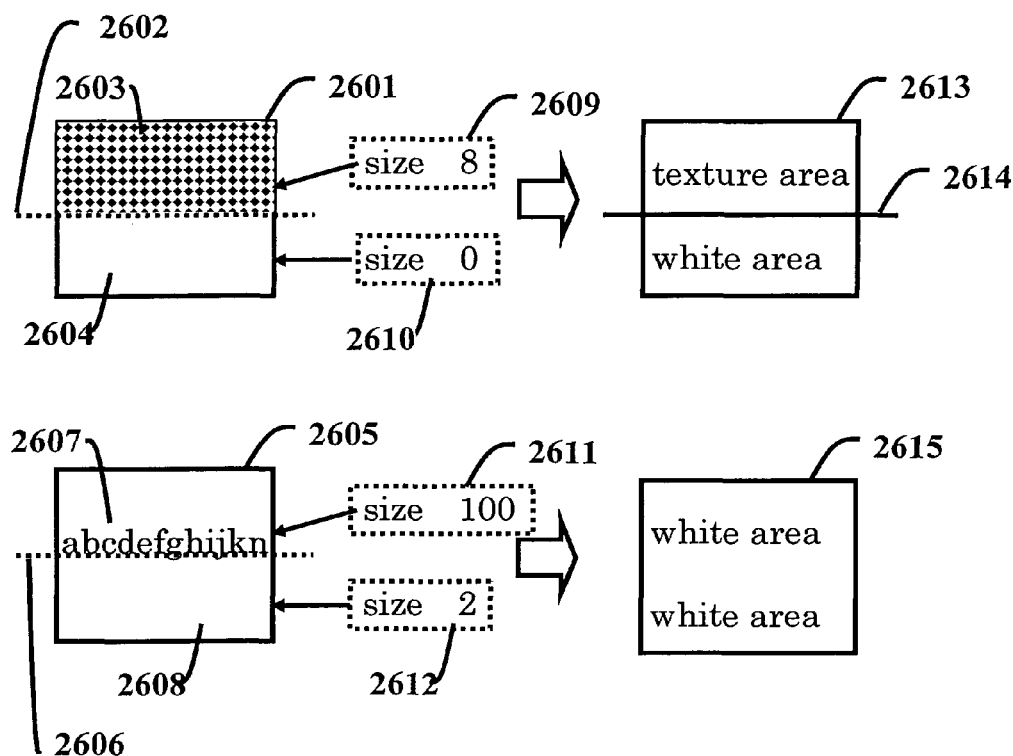
FIG. 24 is a diagram illustrating determination of a texture border.

FIG. 24 is a diagram illustrating determination of a texture border. In state 2601, a texture area 2603 and a white area 2604 exist. The state 2601 corresponds to a state in which ruled-line-candidate extracting module 24 detects a ruled-line candidate 2602 of a texture border.

In state 2605, a character string 2607 exists in a white area. The state 2605 corresponds to a state in which the edge-line-segment detecting module 23 falsely detects a lower edge of the character string 2607 as a ruled-line candidate 2606 of a texture-border ruled line. The reason for the detection mistake is that the lower edge of a horizontally written continuous character string is aligned on a horizontal axis and is thus falsely recognized as a texture border by the edge-line-segment detecting module 23. That is, the reason is that, although an envelope of a character string is not a texture border, image features of an envelope portion of the character string are very similar to image features representing a texture border.

Accordingly, the ruled-line-information generating module 25 checks whether or not an area sandwiched by ruled-lines is a texture area to determine whether ruled-line candidates are obtained from the texture area or from an envelope of a character string.

With the determination as to whether or not an area is a texture area, when a solid line exists at the position of a ruled-line candidate, it is impossible to determine that no ruled line exists by only checking areas in the vicinity of the ruled-line candidate. In the present embodiment, however, since the ruled-line-candidate extracting module 24 determines that a ruled-line candidate is any of a solid-line ruled line, a border ruled line, and a texture-border ruled line, performing determination on adjacent areas makes it possible to determine the presence/absence of a ruled line.

A method in which black pixels in areas at two opposite sides of a ruled-line candidate are grouped and an average value of the sizes of the black pixel groups is obtained is available to determine whether or not an area is a texture area. The size of a black-pixel group in a texture area is smaller than the size of a black-pixel group in a character string. Thus, pre-measuring statistics of the sizes of black-pixel groups for characters and setting a black-pixel-group size threshold for separating characters and a texture makes it possible to distinguish between a character string and a texture area. In FIG. 24, the average value of a size 2609 of the black-pixel group in the texture area 2603 in the state 2601 is 8 dots, the average value of a size 2610 of a black-pixel group in the white area 2604 in the state 2601 is 0 dot, the average value of a size 2611 of a black-pixel group in a white area including the character string in the state 2605 is 100 dots, and the average value of a size 2612 of a black-pixel group in a texture area in the state 2605 is 2 dots. In this case, the size of a black-pixel group is assumed to be preset to "50" as the threshold for determining whether or not the area is a texture area.

The ruled-line-information generating module 25 compares the sizes of the black-pixel groups contained in the areas 2603 and 2604 that sandwich the ruled-line candidate 2602 of the texture-border ruled line in the state 2601 with the threshold "50". The sizes 2609 and 2610 have smaller values than the threshold. Thus, the ruled-line-information generating module 25 determines that the ruled-line candidate 2602 is a texture-border ruled line. The ruled-line-information generating module 25 also compares the sizes of the black-pixel groups contained in the character-string-containing area 2607 and the area 2608 that sandwich the ruled-line candidate 2606 of the texture-border ruled line in the state 2605 with the threshold "50". The size 2611 has a greater value than the threshold. Thus, the ruled-line-information generating module 25 determines that the ruled-line candidate 2606 is a line resulting from false detection of the lower edge of the character string.

A description will now be given of modification processing executed by the ruled-line-information generating module 25. It is also possible to modify a ruled-line candidate when the width and height of a ruled line satisfy a predetermined condition. The term "modification" herein refers to processing in which, for example, the ruled-line-information generating module 25 sets the width of a ruled-line candidate that becomes a border ruled line or a ruled-line candidate that becomes a texture-border ruled line to a minimum value (e.g., 1 dot).

Examples of the predetermined condition will now be described. As one example, a ruled line obtained from an area border has no width in theory, but gives rise to a width during the actual ruled-line extraction processing. Thus, it is possible to perform processing for modifying a ruled-line candidate that has been determined as a border ruled line. As another example, during the black-pixel grouping processing executed by the run-line-segment detecting module 22, there are cases in which the width of a ruled line, for example, the black-pixel rectangular area 62 shown in FIG. 8, is increased. Thus, it is possible to execute processing for modifying the width of the ruled line having the increased width.

As described above, the ruled-line-information generating module 25 determines ruled-line information based on the positional relationship of ruled-line candidates before they are converted into ruled-line information, and determines ruled-line information by using a parameter corresponding to the type of ruled-line candidates.

A description will now be given of a method for deleting a falsely extracted ruled-line candidate. The false extraction means falsely extracting line-segment information that is non ruled-line, such as characters, from an image. Extraction of various types of ruled lines, such as a solid-line ruled line, border ruled line, and texture-border ruled line, increases the influence of the false extraction.

Figure 25:
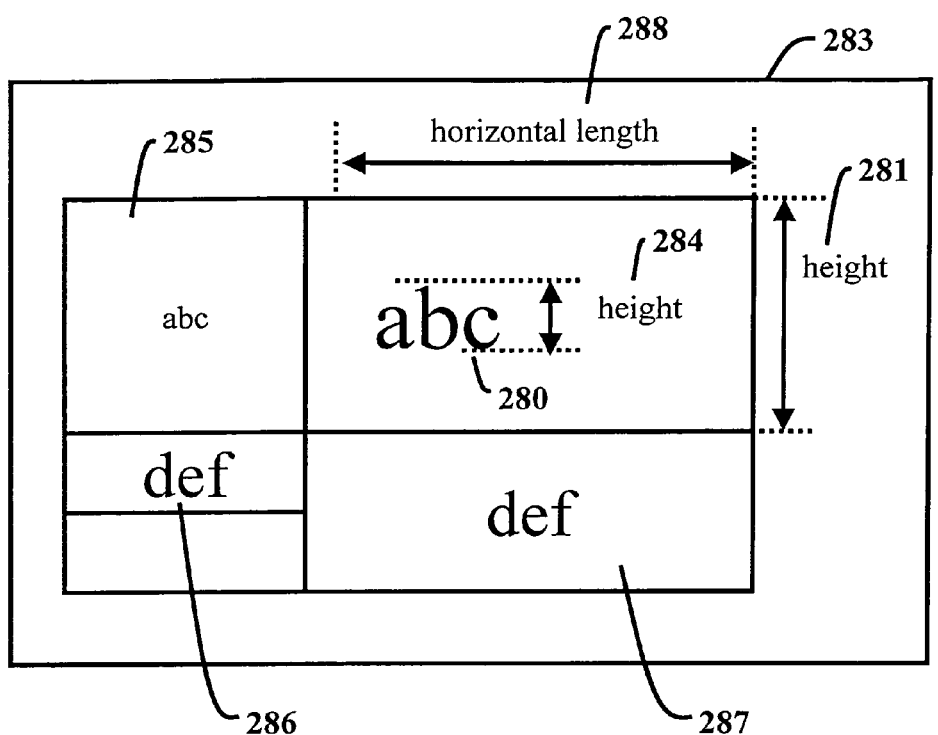
FIG. 25 is a diagram showing a relationship between a table and the size of a character string in a field in the table.

The deleting module 26 needs to determine that a ruled-line candidate falsely detected from non ruled-lines is a wrong ruled-line candidate. Falsely extracted ruled-line candidates include, for example, ruled-lines candidates extracted from characters in fields in a table. FIG. 25 is a diagram showing a relationship between a table 283 and the size of a character string in a field in the table. A character string 280 in the table 283 generally fits within a field area included in the table 283. A vertical length 284 of ruled-line candidates falsely extracted from the character string 280 in the field in the table 283 is less than a height 281 of the field areas in the corresponding row. Ruled lines in the table 283 are generally connected to the top and bottom edges of rows, and thus are longer than the heights of areas in the rows. The same is true for a horizontal length 288 of the fields in the table 283. This relationship is applicable to, for example, relationships between the sizes of the areas of other fields 285, 286, and 287 in the table 283 and the sizes of character strings written in the fields 285, 286, and 287. The height of a field area has a greater value than the height of a character string. Thus, specifying each field area in the table 283 allows an appropriate-length threshold for deleting ruled-line candidates in the item to be determined based on the height information or width information of the field. In the following description, an area on which a determination as to whether or not ruled-line candidates are to be deleted is performed is referred to as a "ruled-line determination area".

Figure 26:
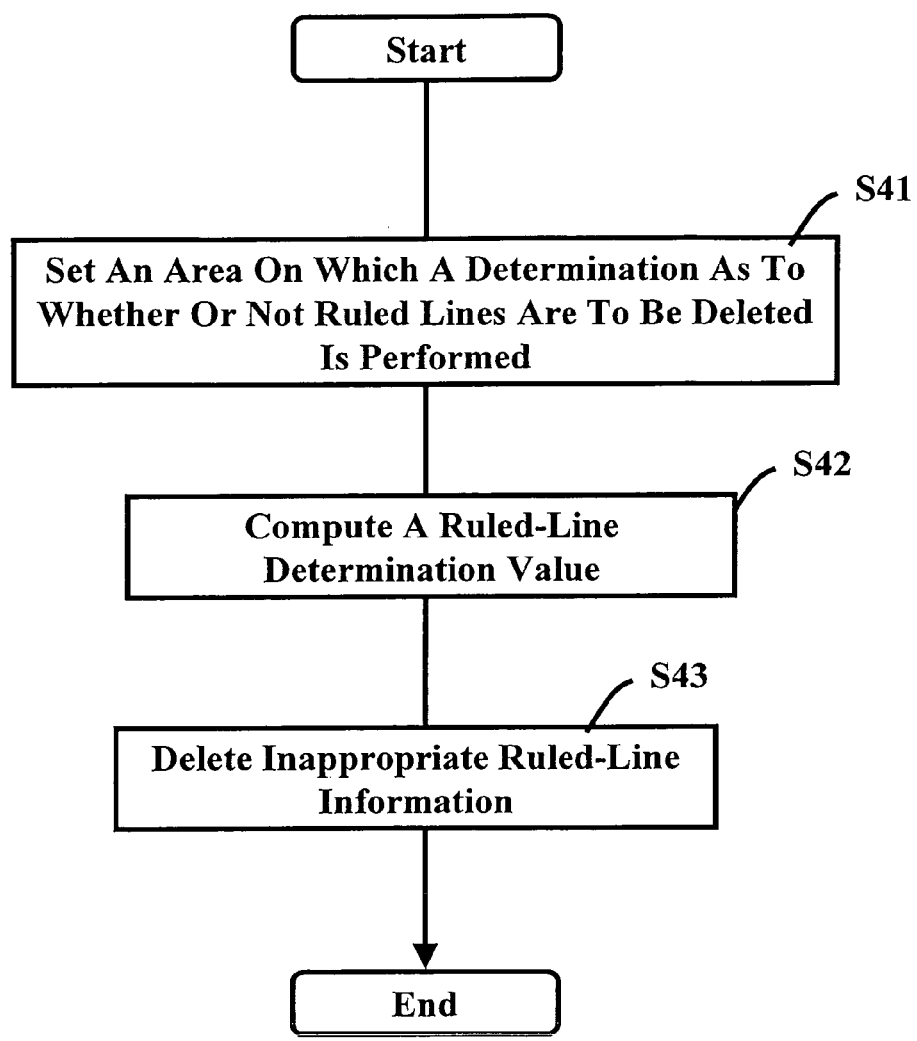
FIG. 26 is a flowchart of processing executed by deleting module.

Processing executed by the deleting module 26 will now be described. FIG. 26 is a flowchart of processing executed by the deleting module 26. The deleting module 26 sets an area on which a determination as to whether or not ruled lines are to be deleted is performed (in step S41).

The deleting module 26 detects confirmed ruled lines in document-image data. Based on a determination criterion for identifying a confirmed ruled line, for example, a ruled line having a length that is greater than a predetermined threshold is identified as a confirmed ruled line. For example, when input document-image data has a resolution of 200 dpi, the threshold that serves as the confirmed-ruled-line determination criterion may be about 100 dots (about 12.7 mm). The use of a longer ruled line as a confirmed ruled line makes it possible to prevent inappropriate ruled-line information from being used for setting a ruled-line determination area. Examples of the inappropriate ruled-line information include ruled-line information extracted from non ruled-lines, such as ruled-line-like information falsely detected from a character. The deleting module 26 detects a set of parallel and adjacent confirmed ruled lines from a collection of confirmed ruled lines and generates a ruled-line determination area.

Figure 27:
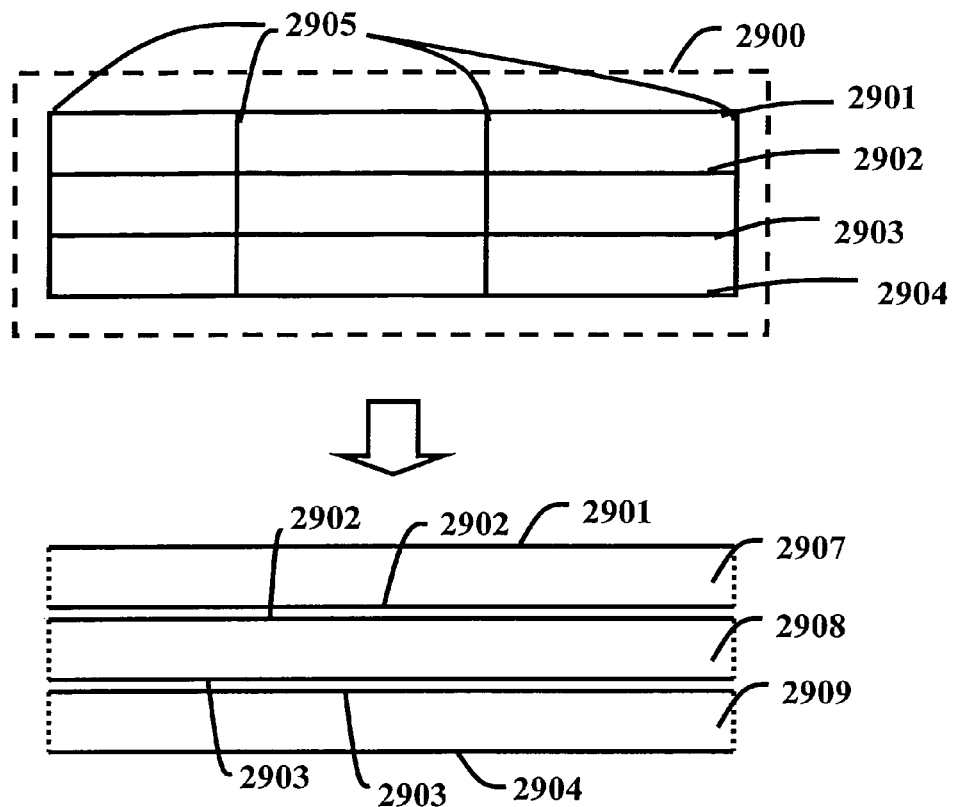
FIG. 27 shows an example of setting a ruled-line determination area.

FIG. 27 shows an example of setting a ruled-line determination area. A ruled-line determination area in the present embodiment is assumed to be a rectangular area sandwiched by long ruled-lines that are adjacent to each other. In the following description, ruled lines for specifying a ruled-line determination area are assumed to be confirmed ruled lines. A table 2900 at the upper part in FIG. 27 has long horizontal ruled-line information 2901, 2902, 2903, and 2904. The table 2900 also has vertical ruled lines 2905. Of the ruled-line information of the horizontal ruled lines in the table 2900, sets of parallel and adjacent ruled-line information are a set of 2901 and 2902, a set of 2902 and 2903, and a set of 2903 and 2904. The areas sandwiched by the sets serves as ruled-line determination areas 2907, 2908, and 2909, as shown at the lower part in FIG. 27.

The sets of confirmed ruled lines do not necessarily have to have the same length as shown in FIG. 27. For example, a set of confirmed ruled lines may be partially parallel to each other.

Figure 28:
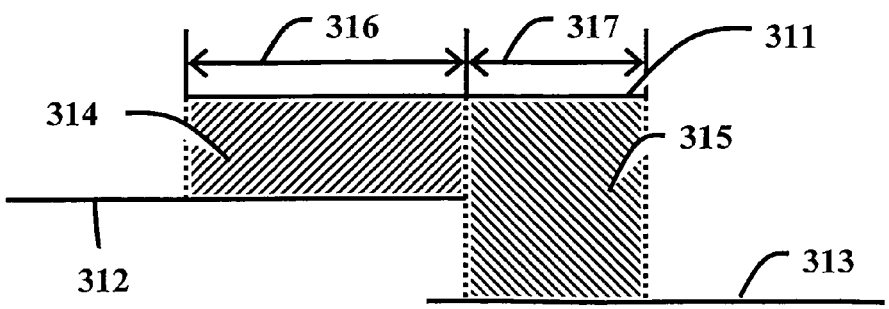
FIG. 28 is a diagram illustrating a state in which confirmed ruled lines in document-image data are partially parallel to each other.

FIG. 28 is a diagram illustrating a state in which confirmed ruled lines in document-image data are partially parallel to each other. FIG. 28 shows confirmed ruled lines 311, 312, and 313. The confirmed ruled lines 311, 312, and 313 are partially parallel to each other. The confirmed ruled lines 311 and 312 are parallel and adjacent to each other in an area 316. The confirmed ruled lines 311 and 313 are parallel and adjacent to each other in an area 317. A rectangular area defined by the confirmed ruled lines 311 and 312 in the area 316 is a ruled-line determination area 314. A rectangular area defined by the confirmed ruled lines 311 and 313 in the area 317 is a ruled-line determination area 315. When confirmed ruled lines are partially parallel to each other, the deleting module 26 regards only an area defined by only parallel and adjacent parts as a ruled-line determination area and registers the ruled-line determination area.

Figure 29:
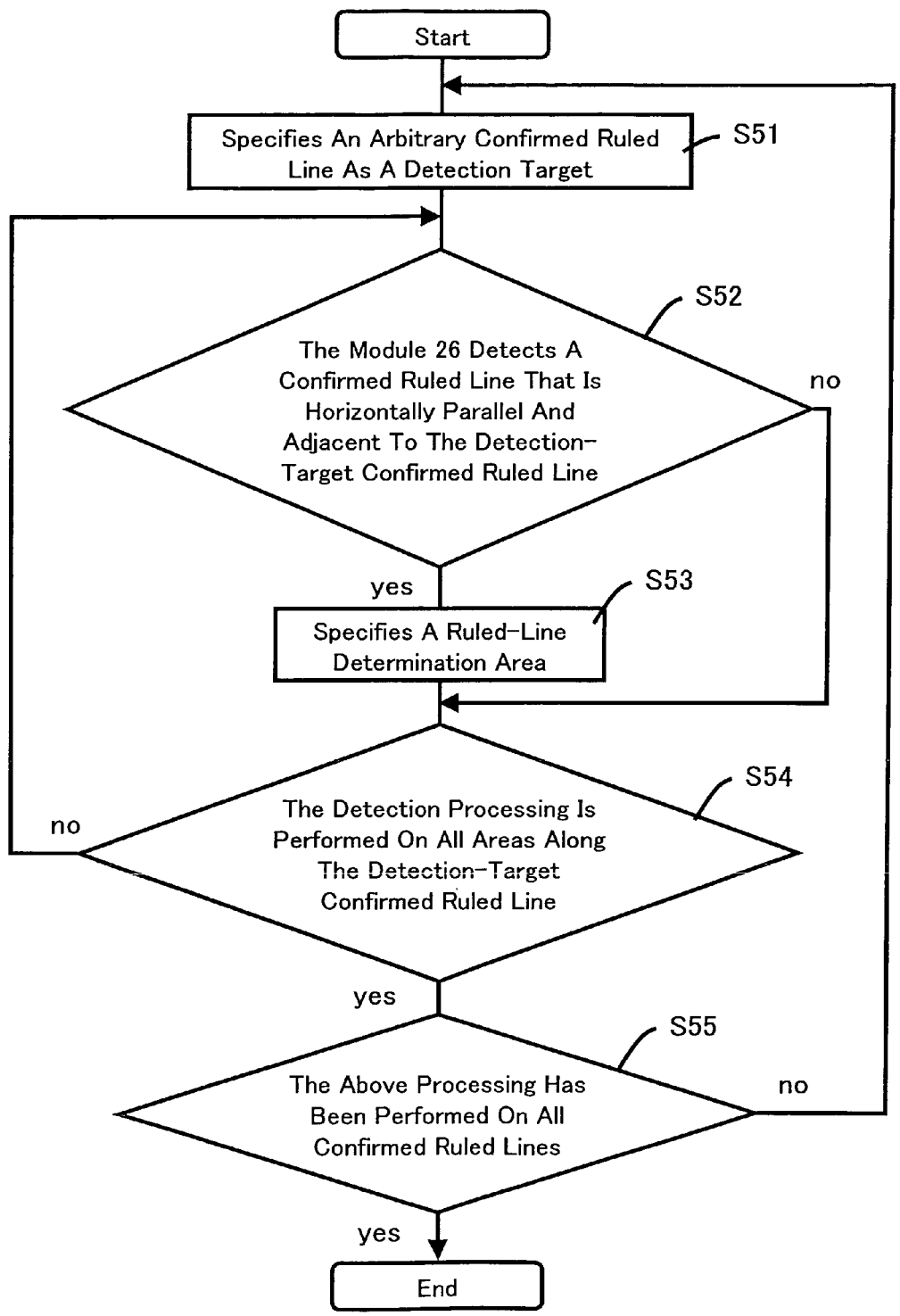
FIG. 29 is a flowchart of processing in which the deleting module specifies a ruled-line determination area.

Processing executed by the deleting module 26 will now be described. FIG. 29 is a flowchart illustrating processing in which the deleting module 26 specifies a ruled-line determination area. The deleting module 26 specifies an arbitrary confirmed ruled line as a detection target (in step S51). In FIG. 28, the deleting module 26 specifies the confirmed ruled line 311 as a detection target. The deleting module 26 detects a confirmed ruled line that is located below a detection-target confirmed ruled line in document-image data and that is horizontally parallel and adjacent to the detection-target confirmed ruled line (in step S52). In FIG. 28, the deleting module 26 detects the confirmed ruled line 312 that is located below the confirmed ruled line 311 and that is horizontally parallel and adjacent thereto. Upon detecting an adjacent confirmed ruled line (Yes in step S52), the deleting module 26 specifies a ruled-line determination area in an area defined by the detection-target confirmed ruled line and the adjacent confirmed ruled line (in step S53). In FIG. 28, upon detecting the confirmed ruled line 312 (Yes in step S52), the deleting module 26 specifies the ruled-line determination area 341 formed by the area 316 (in step S53).

When the detection processing has not been performed on all horizontal areas along the detection-target confirmed ruled line specified in step S51 (No in step S54), the deleting module 26 performs detection processing again on the remaining horizontal areas along the detection-target confirmed ruled lines. In FIG. 28, when the detection processing has not been performed all horizontal areas along the confirmed ruled line 311 (No in step S54), the deleting module 26 performs detection processing again on the remaining horizontal areas along the confirmed ruled line 311. In FIG. 28, with respect to the area 317, the deleting module 26 detects the confirmed ruled line 313 that is located below the confirmed ruled line 311 and that is horizontally parallel and adjacent thereto. In FIG. 28, the deleting module 26 specifies the ruled-line determination area 315 formed by the area 317.

When the detection processing is performed on all horizontal areas along the detection-target confirmed ruled line (Yes in step S54), the deleting module 26 determines whether or not detection of adjacent confirmed ruled lines has been completed with respect to all confirmed ruled lines in the document-image data (in step S55). In FIG. 28, when the detection processing has been performed on all horizontal areas along the confirmed ruled line 311, the deleting module 26 determines whether or not detection of adjacent confirmed ruled lines has been completed with respect to all confirmed ruled lines in the document-image data. When the above-described processing has been performed on all confirmed ruled lines specified in the document-image data (Yes in step S55), the deleting module 26 registers the resulting ruled-line determination areas, thereby completing the processing.

Referring back to FIG. 26, the deleting module 26 computes a ruled-line determination value corresponding to the ruled-line determination area (in step S42). The ruled-line determination value is a threshold for determining whether or not a ruled line contained in the ruled-line determination area is to be true ruled-line information. In the present embodiment, the ruled-line determination value is length information of a ruled line. Based on the length information for determining a ruled-line, the deleting module 26 deletes an inappropriate ruled line.

The deleting module 26 sets a length threshold for each ruled-line determination area. For example, the deleting module 26 obtains height information of a ruled-line determination area and sets the threshold to a length that is slightly greater than the height information. For example, for an image having a resolution of 200 dpi, the threshold is set to a length that is about 20 dots less than the number of dots of the height of the ruled-line determination area. For example, there is a method for determining a frequency distribution of the lengths of ruled-line candidates in a ruled-line determination area and setting the threshold to a maximum value of the frequency distribution or to twice the length of a ruled-line candidate corresponding to a maximum value of the frequency distribution.

Next, the deleting module 26 deletes inappropriate ruled-line information (in step S43). More specifically, the deleting module 26 deletes inappropriate ruled-line information in a ruled-line determination area defined by parallel confirmed ruled lines. The inappropriate ruled-line information is ruled-line information having a length that is less than the ruled-line determining length information determined in step S42. In the present embodiment, the deleting module 26 deletes inappropriate vertical ruled-line information in a ruled-line determination area defined by a set of confirmed ruled-line information in the horizontal direction. In the processing in step S43, not only the vertical ruled-line information but also horizontal ruled-line information may be deleted. Many pieces of inappropriate ruled-line information result from false detection of character information. This is because the horizontal length and vertical length of a falsely detected character are about the same.

Figure 30:
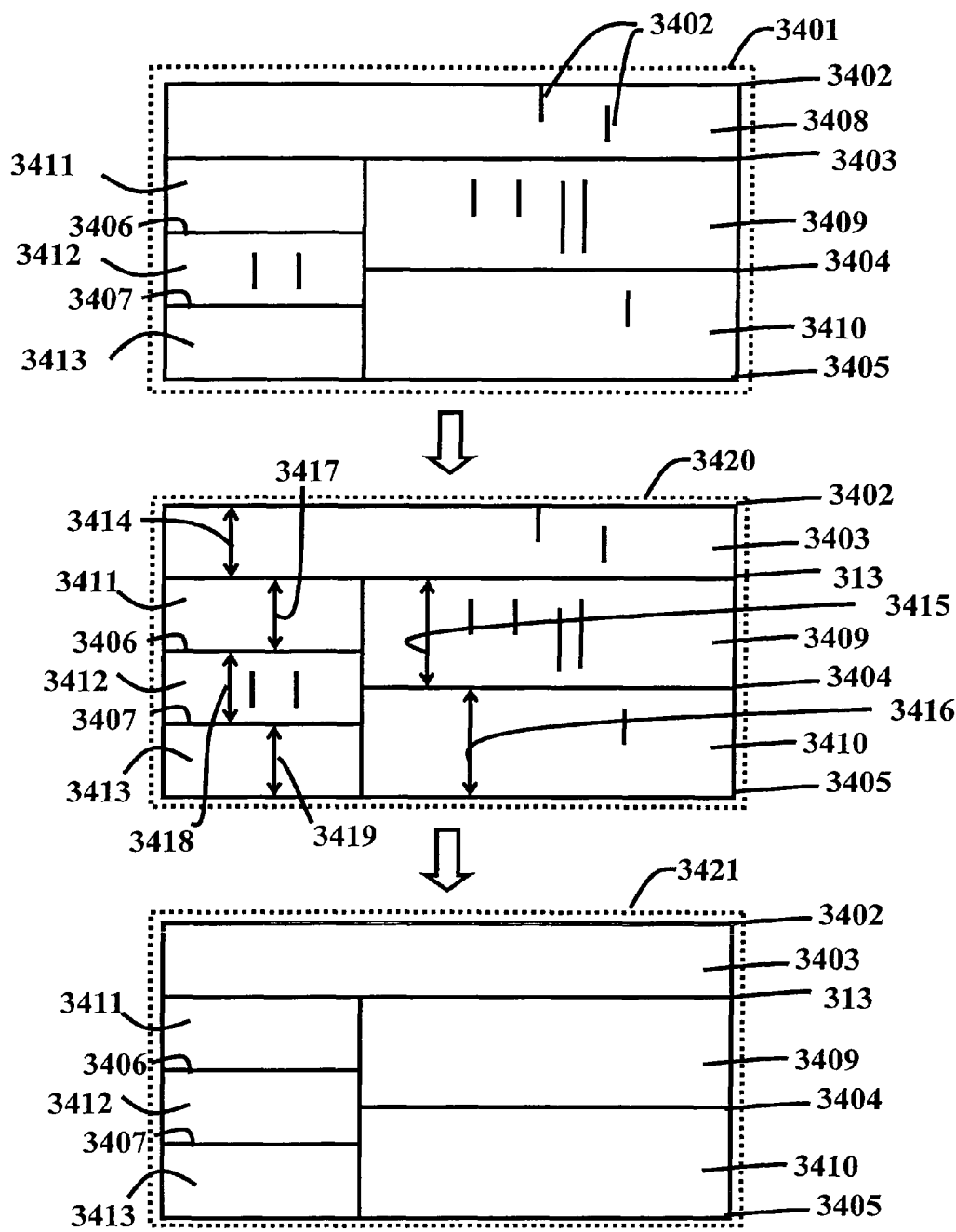
FIG. 30 is a diagram illustrating a case in which the deleting module deletes inappropriate ruled lines.

FIG. 30 is a diagram illustrating a case in which the deleting module 26 deletes inappropriate ruled lines. A table 3401 at the upper part in FIG. 30 shows ruled-line information in a table in document-image data, the ruled-line information being generated by the ruled-line-information generating module 25. The table 3401 has confirmed ruled lines 3402, 3403, 3404, 3405, 3406, and 3407. The table 3401 has a ruled-line determination area 3408 defined by the confirmed ruled lines 3402 and 3403, a ruled-line determination area 3409 defined by the confirmed ruled lines 3403 and 3404, a ruled-line determination area 3410 defined by the confirmed ruled lines 3404 and 3405, a ruled-line determination area 3411 defined by the confirmed ruled lines 3403 and 3406, a ruled-line determination area 3412 defined by the confirmed ruled lines 3406 and 3407, and a ruled-line determination area 3413 defined by the confirmed ruled lines 3407 and 3405. A table 3420 at the middle part in FIG. 30 further indicates an area height for specifying a length for deleting inappropriate ruled-line information for each ruled-line determination area. The deleting module 26 determines the length information for deleting inappropriate ruled-line information for each ruled-line determination area, based on the followings. That is, with respect to the ruled-line determination area 3408, the deleting module 26 determines the length information based on a height 3414 of the ruled-line determination area 3408. With respect to the ruled-line determination area 3409, the deleting module 26 determines the length information based on a height 3415 of the ruled-line determination area 3409. With respect to the ruled-line determination area 3410, the deleting module 26 determines the length information based on a height 3416 of the ruled-line determination area 3410. With respect to the ruled-line determination area 3411, the deleting module 26 determines the length information based on a height 3417 of the ruled-line determination area 3411. With respect to the ruled-line determination area 3412, the deleting module 26 determines the length information based on a height 3418 of the ruled-line determination area 3412. With respect to the ruled-line determination area 3413, the deleting module 26 determines the length information based on a height 3419 of the ruled-line determination area 3413.

In accordance with the ruled-line determining length information determined for each ruled-line determination area, the deleting module 26 determines whether ruled-line information in the ruled-line determination area is appropriate or inappropriate. More specifically, the deleting module 26 deletes ruled-line information having a length that is less than the ruled-line determining length information determined for each ruled-line determination area. A table 3421 at the lower part in FIG. 30 shows a state in which the ruled-line information in the areas in the table 3401 is deleted.

When the ruled-line-information generating module 25 sets the parameter, it is also possible to perform high-accuracy ruled-line extraction by specifying ruled-line determination areas and setting an appropriate parameter for each ruled-line determination area. For example, for a texture area, the threshold for ruled-line determination may be set to a greater value.

The outputting module 27 outputs the ruled-line information obtained by the above-described processing.

According to the embodiment described above, even when multiple types of ruled lines including solid lines, border ruled lines, and texture-border ruled lines exist in an input image, appropriate ruled-line extraction processing can be performed in accordance with each type of ruled line. As a result, the accuracy of the ruled-line extraction can be improved. Thus, the load for an error correction task for the ruled-line extraction can be reduced, and the user's work hours can be reduced.

In addition, since the threshold information for deleting inappropriate ruled lines can be changed for each area included in a table, error detected can be minimized even when the sizes of fields in the table are different from each other.

Conventionally, both a run line segment and an edge line segment are extracted to generate ruled-line candidates, which are then subjected to noise elimination to generate respective ruled-line information, and the resulting pieces of information are integrated together. That is, the run line segment and the edge line segment are not directly compared with each other. When edge extraction is used to detect a texture area and a solid-line border, a total of three ruled-line candidates, i.e., one ruled-line candidate for the texture area and two ruled-line candidates for the solid-line border, are detected as line-segment candidates. However, when the texture border and the solid-line border are located adjacent to each other, it is difficult to associate a set of line segments that form a solid line, since the distance between the edge line segments are close to each other. Thus, according to the related technology, it is impossible determine which of the three detected edge line segments are to be integrated together and converted into a solid line. As another related technology, a method in which run-line-segment extracting module and edge-line-segment extracting module are executed in parallel and the resulting ruled-line extraction results are integrated together is available. However, the method also requires a difficult determination, such as selecting one ruled-line candidate when competing ruled-line candidates are extracted from the same area. As described above, only a combination of the related technologies cannot perform high-accuracy extraction of ruled lines from an image in which multiple types of ruled lines coexist.

On the other hand, according to the present embodiment, as a result of superimposition of a run line segment and edge line segments, the run line segment is sandwiched between two edge line segments to be integrated into one solid-line ruled line. Thus, a solid-line ruled line and border ruled line can be appropriately generated. As described above, a run line segment and an edge line segment are compared with each other before ruled-line information is generated from ruled-line candidates, so that multiple types of ruled lines can be extracted with high accuracy. In addition, since the ruled-line generation parameter is changed in accordance with the type of ruled line, ruled lines can be extracted with high accuracy.

Accordingly, it is an object of the embodiment to accurately detect table ruled lines expressed by shapes, patterns, and colors contained in a document image.

The embodiment provides a first table recognition program for a table recognition apparatus that reads a document image containing a table and that extracts ruled lines.

According to the embodiment, the type of ruled line is identified based on a positional relationship between a ruled-line candidate resulting from run detection and a ruled-line candidate resulting from edge detection, and a ruled line is detected based on a condition corresponding to the type of ruled line. Thus, it is possible to accurately detect table ruled lines expressed by shapes, patterns, and colors contained in a document image.

What is claimed is:

1. A method of detecting ruled line information contained in image information including a plurality of pixels in either one of first and second states executed by a computer, the method comprising:
    detecting, by the computer a first group of pixels in the first state disposed linearly continuously in said image information;
    determining, by the computer, first line information based on the first group of pixels;
    detecting, by the computer, a second group of pixels in the first state disposed adjacently with each other and surrounded by pixels in the second state;
    determining, by the computer, edge information based on a contour of the second group of pixels;
    determining, by the computer, at least one type of ruled line candidate in a table in a document image based on a positional relationship between the first line information and the edge information; and
    generating the ruled line information in accordance with the at least one type of ruled line candidate.

2. The method according to claim 1, wherein said determining the at least one type of ruled line candidate determines a first type of ruled line candidate where a first line, indicated by the first line information, is sandwiched by a pair of edges indicated by the edge information and a distance among the first line and the pair of edges is less than a predetermined value.

3. An apparatus for detecting ruled line information contained in image information including a plurality of pixels in either one of first and second states, comprising:
- a memory storing image information; and
- a processor executing a process comprising:
  - detecting a first group of pixels in the first state disposed linearly continuously in said image information;
  - determining first line information based on the first group of pixels;
  - detecting a second group of pixels in the first state disposed adjacently with each other and surrounded by pixels in the second state
  - determining edge information based on the contour of the second group of pixels;
  - determining at least one type of ruled line candidate in a table in a document image based on a positional relationship between the first line information and the edge information; and
  - generating the ruled line information in accordance with the at least one type of ruled line candidate.

4. The apparatus according to claim 3, wherein the determining of the at least one type of ruled line candidate determines a first type of ruled line candidate where a first line, indicated by the first line information, is sandwiched by a pair of edges, indicated by the edge information, and a distance among the first line and the pair of edges is less than a predetermined value.

5. The apparatus according to claim 4, wherein the determining of the at least one type of ruled line candidate determines a second type of ruled line candidate where a second line, indicated by the first line information, is substantially parallel and adjacent to a first edge, indicated by the edge information, within a predetermined distance from the edge.

6. The apparatus according to claim 5, wherein the determining of the at least one type of ruled line candidate determines a third type of ruled line candidate where a second edge is indicated by the edge information and the first line information does not indicate any line within a predetermined distance from the second edge.

7. The apparatus according to claim 3, wherein the determining of the edge information includes
- smoothing the image information to produce a smoothed image with the contour; and
- extracting the edge information from the contour of the smoothed image.

8. The apparatus according to claim 3, wherein the determining of the at least one type of ruled line candidate includes superimposing a first line, indicated by the first line information, on at least one edge indicated by the edge information.

9. The apparatus according to claim 2, wherein said determining of the at least one type of ruled line candidate determines a second type of ruled line candidate where a second line, indicated by the first line information, is substantially parallel and adjacent to a first edge, indicated by the edge information, within a predetermined distance from the edge.

10. The apparatus according to claim 9, wherein said determining of the at least one type of ruled line candidate determines a third type of ruled line candidate where a second edge is indicated by the edge information and the first line information does not indicate any line within a predetermined distance from the second edge.

11. The apparatus according to claim 1, wherein said determining of the edge information includes
- smoothing the image information to produce a smoothed image with the contour; and
- extracting the edge information from the contour of the smoothed image.

12. The apparatus according to claim 1, wherein said determining of the at least one type of ruled line candidate includes superimposing a first line, indicated by the first line information, on at least one edge indicated by the edge information.

* * * * *